(12) United States Patent
Guan et al.

(10) Patent No.: US 12,185,206 B2
(45) Date of Patent: Dec. 31, 2024

(54) SERVICE DISCOVERY AND SESSION ESTABLISHMENT FOR MACHINE-LEARNING-BASED BEAM PREDICTION IN WIRELESS COMMUNICATIONS

(71) Applicant: QUALCOMM Incorporated, San Diego, CA (US)

(72) Inventors: Kyle Chi Guan, New York, NY (US); Himaja Kesavareddigari, Bridgewater, NJ (US); Qing Li, Princeton Junction, NJ (US); Kapil Gulati, Belle Mead, NJ (US); Junyi Li, Fairless Hills, PA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/714,977

(22) Filed: Apr. 6, 2022

(65) Prior Publication Data
US 2023/0328492 A1 Oct. 12, 2023

(51) Int. Cl.
*H04W 4/50* (2018.01)
*G06N 5/04* (2023.01)
(Continued)

(52) U.S. Cl.
CPC .............. *H04W 4/50* (2018.02); *G06N 5/04* (2013.01); *H04W 48/16* (2013.01); *H04W 76/10* (2018.02); *H04W 80/10* (2013.01); *H04W 84/18* (2013.01)

(58) Field of Classification Search
None
See application file for complete search history.

(56) References Cited

U.S. PATENT DOCUMENTS 11,974,171 B2 * 4/2024 Pastuszak ....... H04W 36/00837
2020/0275402 A1 8/2020 Shi
(Continued)

FOREIGN PATENT DOCUMENTS

WO 2021/155090 8/2021
WO 2021/252443 12/2021
WO 2022/067126 3/2022

OTHER PUBLICATIONS

International Search Report and Written Opinion dated Apr. 28, 2023 from corresponding PCT Application No. PCT/US2023/061492.

Primary Examiner — Kenneth B Wells
(74) Attorney, Agent, or Firm — ArentFox Schiff LLP

(57) ABSTRACT

Aspects of dynamic and interactive machine learning and feature extraction techniques for performing beam interference management are disclosed. In one aspect, upon entering a coverage area, a UE may transmit a discovery message including one or more machine learning (ML) services for ML service discovery. Based on the ML service discovery, the UE may transmit a session request to establish a data service session between the UE and a network node based on the ML service discovery and other criteria such as extracted features. The network node may receive the ML discovery data and extracted features and aggregate this information with other intelligent network devices to enable the network node to predict a beam blockage during the ML inference data service session. The network node can adapt beam blockage predictions by changing the timing and direction of communications between network entities.

30 Claims, 20 Drawing Sheets

(51) Int. Cl.
*H04W 48/16* (2009.01)
*H04W 76/10* (2018.01)
*H04W 80/10* (2009.01)
*H04W 84/18* (2009.01)

(56) References Cited

U.S. PATENT DOCUMENTS

| | | | |
|---|---|---|---|
| 2022/0191776 A1* | 6/2022 | Kim | H04L 67/306 |
| 2023/0081286 A1* | 3/2023 | Liang | H04W 36/0007 |
| | | | 370/331 |
| 2023/0284129 A1* | 9/2023 | Zaus | H04L 41/18 |
| | | | 455/435.2 |
| 2023/0354166 A1* | 11/2023 | Deng | H04W 4/50 |

* cited by examiner

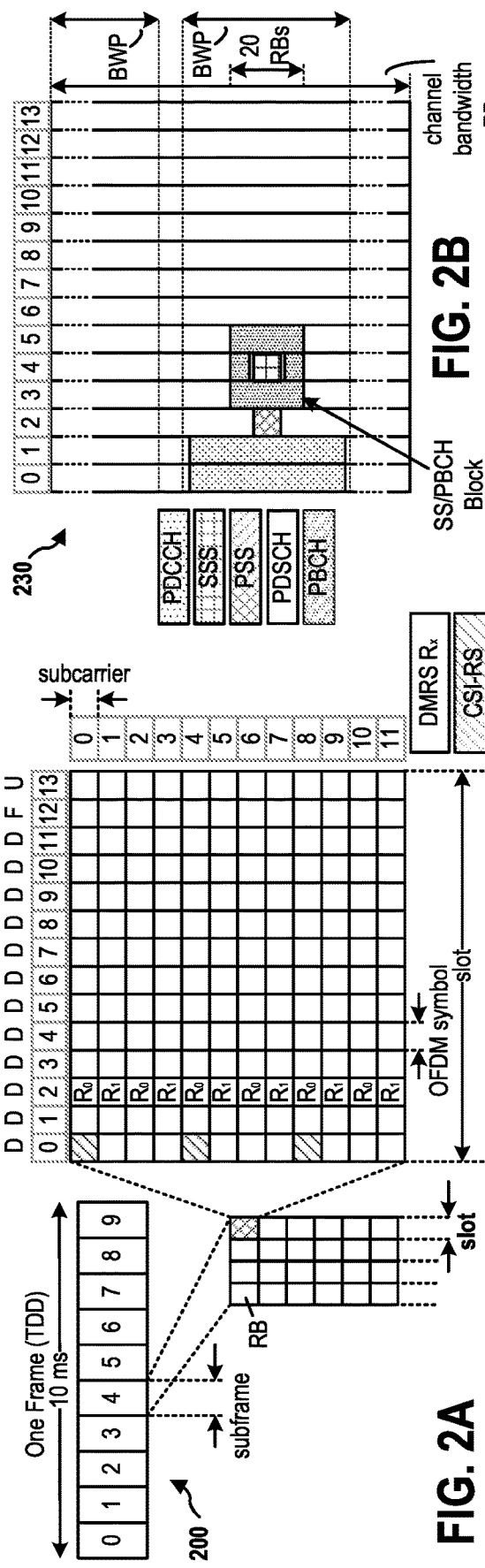
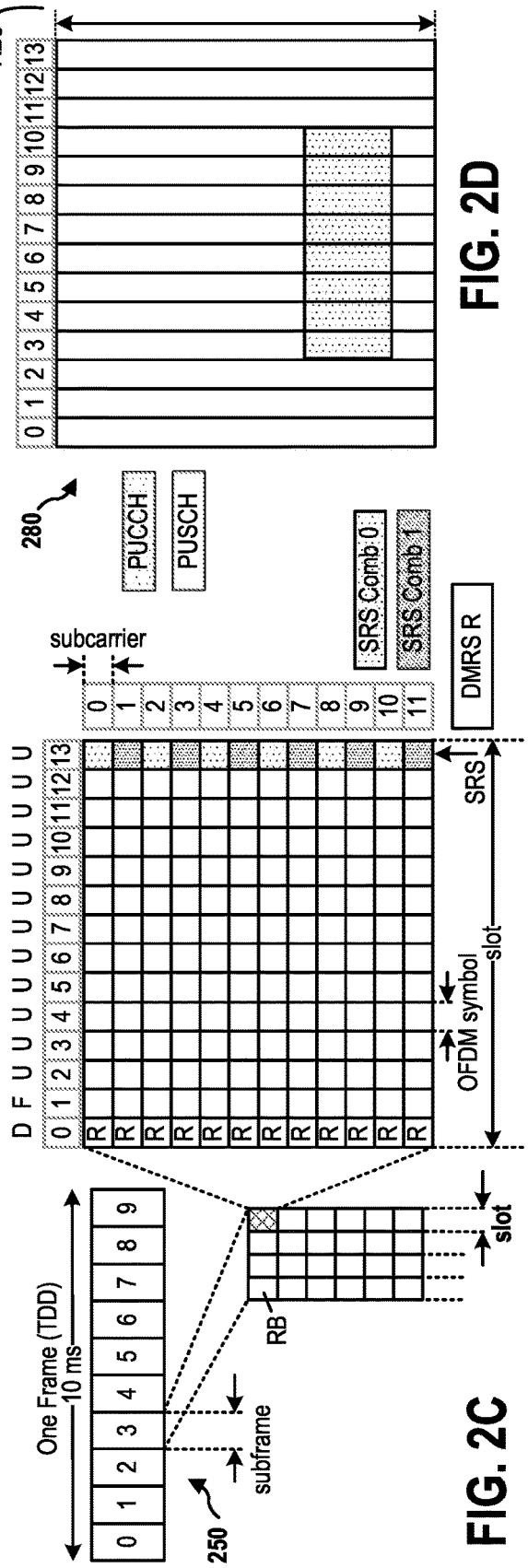
FIG. 2A
FIG. 2B
FIG. 2C
FIG. 2D

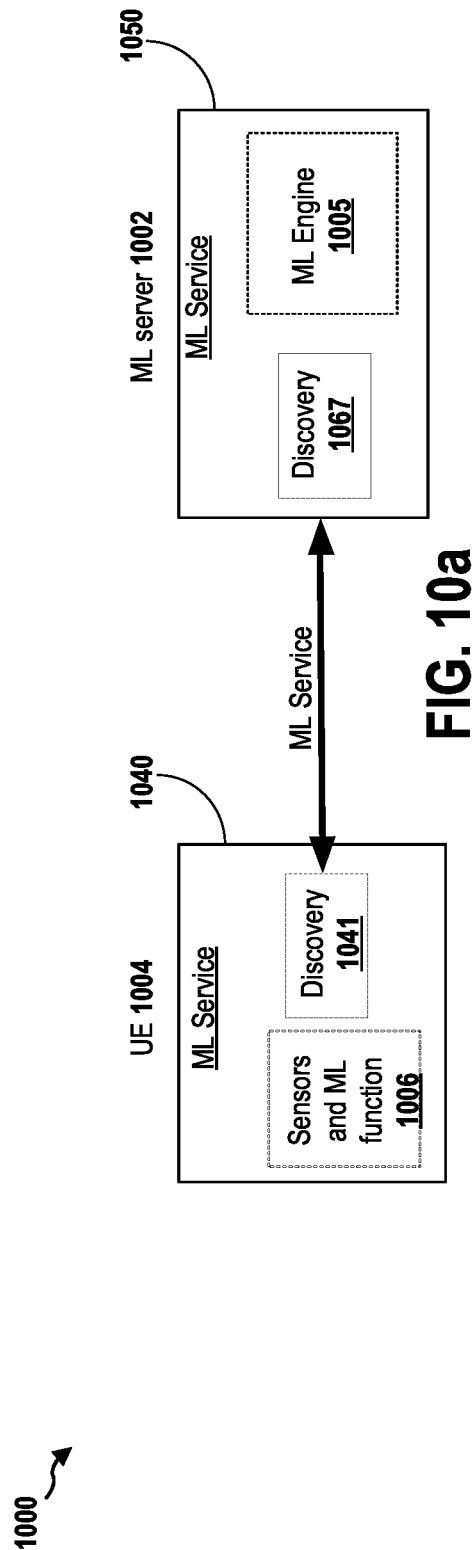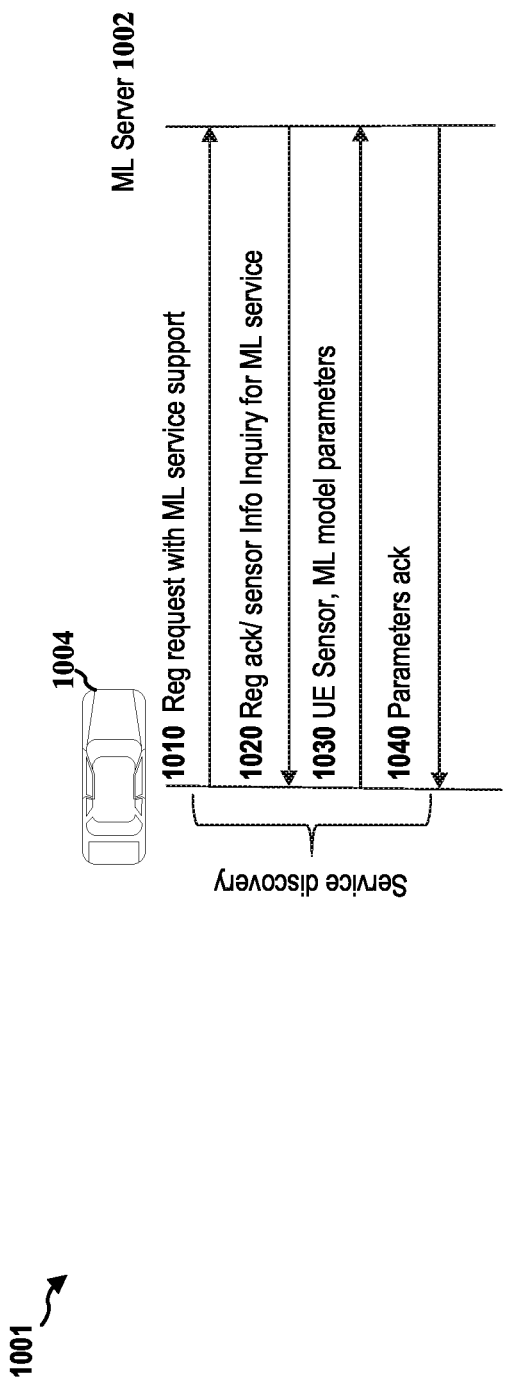
FIG. 10a
FIG. 10b

SERVICE DISCOVERY AND SESSION ESTABLISHMENT FOR MACHINE-LEARNING-BASED BEAM PREDICTION IN WIRELESS COMMUNICATIONS

BACKGROUND

Technical Field

The present disclosure generally relates to communication systems, and more particularly, to adaptive machine learning (ML) and sensor-based inference extraction for dynamic beam interference management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The invention is defined by the claims. Embodiments and aspects that do not fall within the scope of the claims are merely examples used for explanation of the invention.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus and a method are provided. The apparatus for wireless communication at a user equipment (UE) includes memory, and at least one processor coupled to the memory and configured to transmit a discovery message indicating one or more machine learning (ML) services for an ML service discovery, transmit, after the ML service discovery, a session request to establish an ML inference data service session between the UE and a network node based at least in part on the ML service discovery; and transmit ML inference data (e.g. to the network node) for predicting a beam blockage during the ML inference data service session.

In another aspect of the disclosure, another method and apparatus are provided. The apparatus for wireless communication at a network node includes memory, and at least one processor coupled to the memory and configured to receive (e.g., from a user equipment (UE)) a discovery message indicating an ML service for a ML service discovery, receive, after the ML service discovery, a session request to establish an ML inference data service session between the UE and the network node, the network node interfacing with one or more ML inference hosts each including one or more ML models, and receive, from the one or more ML inference hosts, a beam blockage prediction using the inference data during the ML inference data service session.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

FIGS. 10a-b are diagrams illustrating an example of UE-initiated ML service discovery between a UE and the ML server.

DETAILED DESCRIPTION

Figure 1:
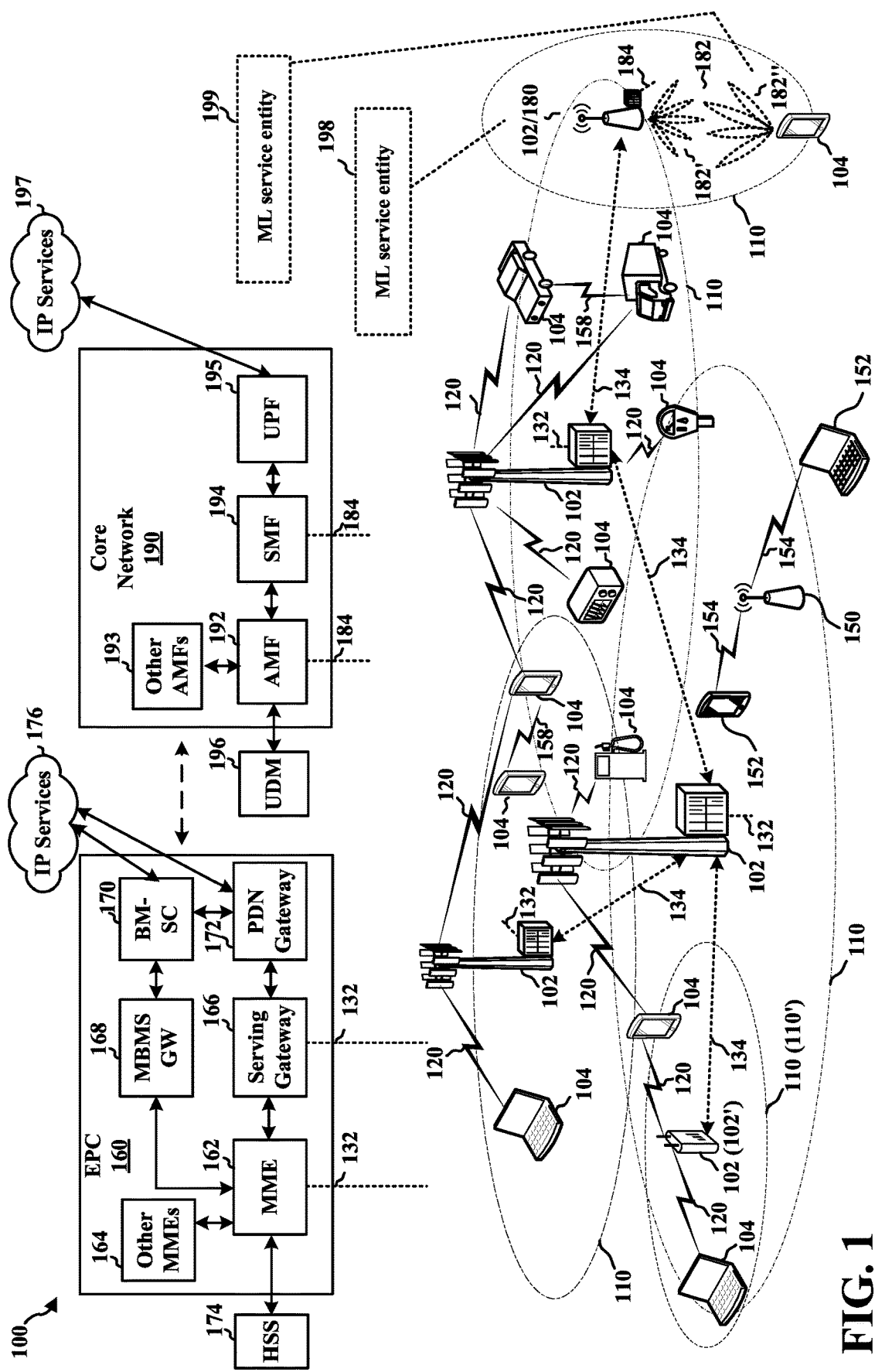
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

With fifth generation (5G) wireless technologies and beyond, wireless networks can operate with substantially higher frequency bands that range, for example, from 28 Gigahertz (GHz) ("FR2"), 60 GHz ("FR4") to above 100 GHz in the Terahertz (THz) band. Due to the high attenuation and diffraction losses inherent in these bands, the blockage of line-of-sight (LOS) paths can profoundly degrade wireless link quality. Blockages can occur frequently, and the received power at the user device can drop significantly if an LOS path is blocked by moving obstacles such as vehicles, pedestrians, or the like.

To overcome these rapid variations in link quality at such high frequencies caused by LOS blockages, vehicles can be equipped with UEs and onboard sensors (e.g., RADARs, LIDARs, cameras, etc.) to provide a radio network with information about moving obstacles that may ultimately degrade signal quality by causing beam blockage. Sensing information can be leveraged to provide radio network information of the communication environments as well as moving obstacles that could otherwise block the LOS beam path.

The context of the problems inherent in the above approach may arise where a vehicle (also called an "ego" vehicle) equipped with sensors, enters into the coverage area in which an ML service entity is included. The coverage area may include moving objects (vehicles, pedestrians, etc.) and stationary objects (buildings), each of which can affect the LOS. The ML service entity may reside within a network entity for that coverage area, for example, a base station such as a Node B, an evolved Node B, a New Radio base station or 5G Node B (gNB). Alternatively, the network entity may itself be the ML service entity, such as an ML service entity residing within a base station. The ML service entity may reside within a base station, in an ML server co-located with the base station, in an ML server located near the base station, or in an ML server located elsewhere (such as in a cloud or edge server). The received sensor information from the entering ego vehicle's UE and potentially from other vehicles in the coverage area may assist the base station working with the ML server or ML service entity.

Aspects of the present disclosure include techniques and apparatuses for ML service discovery. More specifically, a first problem currently contemplated by Applicant and addressed by the above disclosure relates to ML service discovery—namely, how an ML service entity can obtain sensing data or extracted features from vehicles in a wireless coverage area. That is, to obtain sensor data, or even to understand what sensor/feature extraction assets the ML service entity has at its disposal, how an ML service entity can discover whether and which vehicles in the area support sensor-based ML functions or other relevant data extracting features, if any. For example, a vehicular UE (or commonly just a "UE" if apparent in the context) entering the coverage area may be equipped with various types of sensors described above. The UE may also include other extraction features invaluable to an ML service entity for leveraging in requesting specific measurements and extracting the measurement results and other features for use in dynamic beam management and instruction. As such, a robust technique to identify these features in vehicles, coined "ML service discovery", is to date unavailable.

Additional aspects of the present disclosure include techniques and apparatuses for ML service session establishment. Assuming that the above step of ML service discovery is successfully completed, another immediate and unsolved challenge is how an ML session can be established and coordinated to collect sensing information for both ML training and inference with a ML service entity or inference host. This session is instrumental to successful ML training and inference, and dynamic beam prediction. Inference data is the data sent to the inference host, where the data can be sensor data or extracted features or other information used by the inference host. The inference data can be used by an inference host for machine learning based prediction.

In accordance with various aspects of the disclosure, solutions to the aforementioned problems include the use of signaling procedures and parameters for both ML service discovery and ML service session establishment. For example, a UE may support an ML service entity with equipped sensors such as radar or camera. The UE may also support an ML function with one or more neural networks (NNs) within the NL service entity for extracting features from sensor data that may have been collected from a vehicle RADAR or a camera, for example. In one aspect, the UE may include ML service discovery functions within the ML service entity for discovering an ML service, such as centralized beam prediction service discovery. The ML service entity including these functions may reside on the vehicle UE.

In other aspects shown with reference to FIG. 8 and as will be made more apparent later, the communication between the entities does not occur at a lower layer but may instead occur in some examples at a layer above the UE modem's protocol stack on the UE side. Similarly, the ML service entity at the ML server or base station side may perform its functions at a layer above the radio access network (RAN) (such as gNB at 804, including in the deployment in FIG. 8 an exemplary hierarchy of one or more CUs, DUs and RUs on the gNB side). As such, the ML service entity at the vehicle UE may communicate directly with the ML Service entity at the ML server or base station to provide beam prediction service for both discovery and session establishment. In other configurations, the ML service entity at the UE may communicate with the ML service entity at the base station via an RRC connection.

In still other aspects, an ML service entity performing a centralized beam prediction service at the ML server may include one or more ML engines (e.g., ML models for inference), which can predict beam blockages dynamically. The ML engine(s) may achieve these predictions by aggregating the received sensing data or features from a plurality of UEs/vehicles. The ML engine(s) may thereupon proactively direct the gNB to adjust beam operations as a result.

As noted above, the ML service entity may reside within the gNB or at an ML server co-located with the gNB or located near a gNB, such as within a cloud or edge server. Also as noted, the ML service entity may include ML service discovery procedures. In these ML service discovery procedures, the UE's ML service entity in one aspect may use its discovery function/module to exchange required parameters. These may include types, and orientation of sensors, structures that are measured, ML models types used, etc. These parameters may be exchanged with the discovery function/module of the network's ML service entity as defined above.

In a further aspect, ML service session establishment may ensue after ML service discovery. In this phase, in one configuration responsive to a request from a session function of the ML service entity at the ML server or base station, a session function of the UE's ML service entity may provide parameters to the ML service entity's corresponding session function that may enable the ML server or base station to seek different measurements from the vehicle. Parameters received from the UE may include sensor IDs, sensor-mounting location, data collection parameters such as the number of training samples, data collection rate, and duration of samples, model parameters, training related parameters, output parameters for inference tasks or training tasks, and more.

The above information acquired from the vehicles/UEs can thereupon enable the ML service entity to adaptively instruct different vehicles to provide different values, extracted features, and model results to predict beam blockages. Via the ML service entity, the gNB can dynamically partition and schedule the beam transmissions among the UEs in a manner that prevents or reduces degrading LOS interference.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which link may be provided directly or indirectly (e.g., separated from an IAB donor by more than one hop), and/or provide a link for one or more of the UEs 104, both devices of which may communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein might broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as an mmW base station. The mmW base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an ML service entity 199 containing service discovery and session establishment functions configured to request enabling service discovery with a network node, and to establish an ML inference data service session between the UE and the network node based at least in part on the ML service discovery. The UE 104 in this instance may be in a vehicle equipped with sensors and other ML inference models for feature extraction, although the UE may be another automotive form of transport, or with a pedestrian, etc.

The base station 180 in FIG. 1 may also interface with an ML service entity 198 or ML inference host, which may be physically located at the base station or may be in an ML server co-located with the base station 180 or near the base station. The ML service entity 198, or the base station interfacing with the ML service entity, may exchange signals with the UE 104 to perform service discovery and to engage in a sessions establishment in which the ML service entity or base station engages in signaling procedures and parameters with the UE 104, such as collecting sensor data and extracting features and ML parameters to use for beam prediction service discovery and beam prediction session establishment. Predictive and inference-based techniques can be used to determine the likelihood of a beam blockage, in which the ML service entity uses this information to propose an alternative beam selection path, for example, to avoid the predicted LOS obstruction.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Additionally or alternatively, the concepts and various aspects described herein may be of particular applicability to one or more specific areas, such as for use in Open-radio access network (O-RAN) architectures with RAN intelligent controllers (RICs) as described in greater detail below.

In some aspects, the term "receive" and its conjugates (e.g., "receiving" and/or "received," among other examples) may be alternatively referred to as "obtain" or its respective conjugates (e.g., "obtaining" and/or "obtained," among other examples). Similarly, the term "transmit" and its conjugates (e.g., "transmitting" and/or "transmitted," among other examples) may be alternatively referred to as "provide" or its respective conjugates (e.g., "providing" and/or "provided," among other examples), "generate" or its respective conjugates (e.g., "generating" and/or "generated," among other examples), and/or "output" or its respective conjugates (e.g., "outputting" and/or "outputted," among other examples.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The sub-carrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
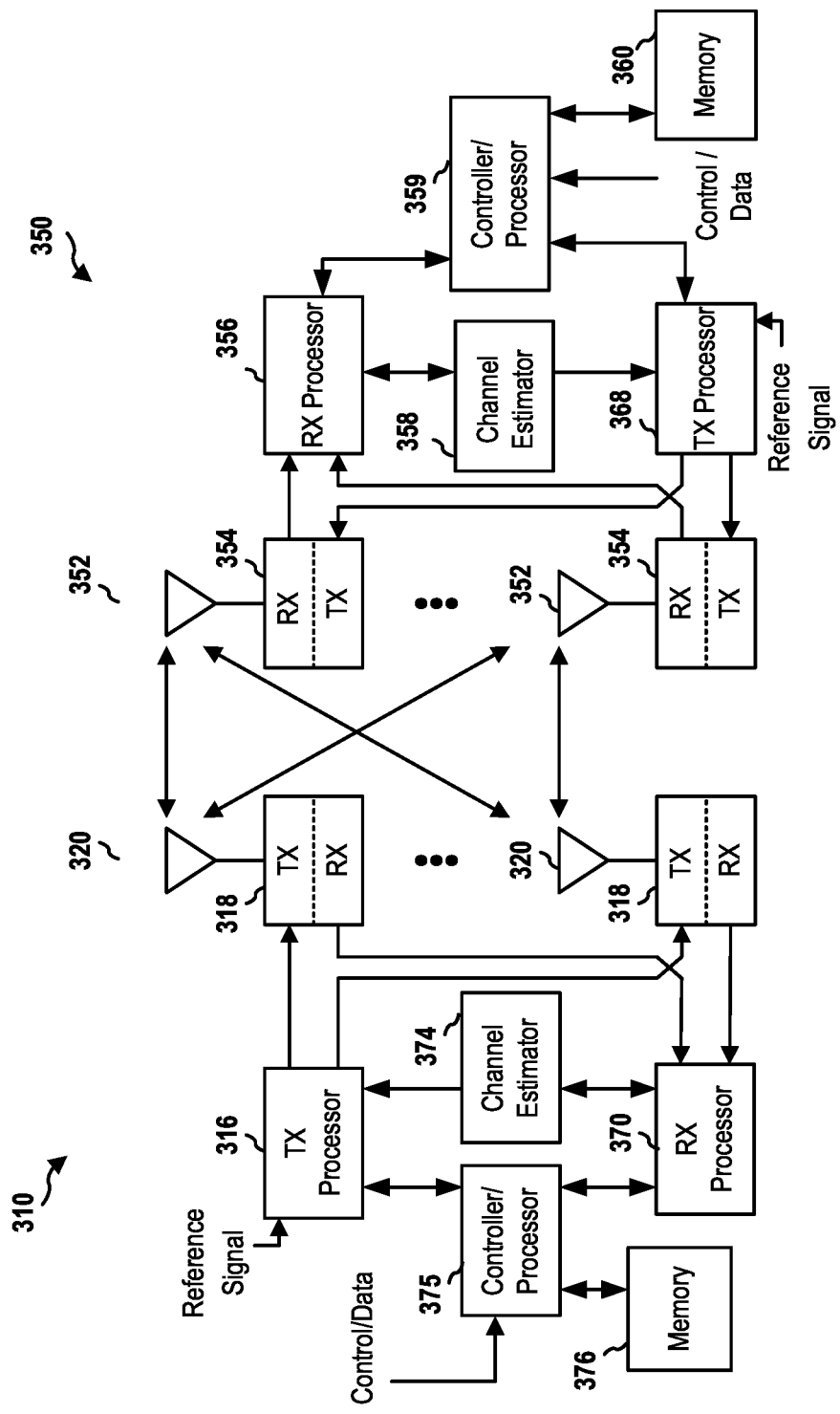
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1. At least one of the TX processor 316, the RX processor 370, and the controller/processor 375 may be configured to perform aspects in connection with 198 of FIG. 1.

With the advent of new wireless technologies and higher transmission beam frequencies, users can enjoy many of the concomitant benefits of these technologies such as faster data rates, artificial intelligence, and more sophisticated machine learning models for performing a variety of tasks. Such technologies, like 5G and the latest Wi-Fi standards, can be used in conjunction with different architectures such as O-RAN. In a disaggregated base station where the base station functionality may be physically distributed, the ML service entity that performs beam interference prediction may be located at a ML server, or at a near-real time RAN intelligent controller (RIC) or a different network node dictated by the specifics of the particular architecture.

Along with these enhanced benefits, the high frequencies also give rise to new challenges for an exemplary coverage area serviced by a base station that may be in a congested area of traffic in a downtown area, for example. The faster network speeds and higher frequencies that run in 5G from 28 GHz to 100 GHz or more, together with the increased number of beams, are more likely to result in LOS blockages that, if left unaddressed, can profoundly degrade performance of the system. These potential blockage problems may be exacerbated by the higher attenuation and diffraction losses that are inherent in these higher frequencies. For these reasons, it is important to establish an effective set of protocols to predict such blockages by moving obstacles such as pedestrians or vehicles, and to redirect communications in or near real time to prevent them.

It should be noted that the term "UE" in this disclosure may often refer to the UE equipped in a vehicle, as is often apparent from the context. For the same reasons, the use of the term "vehicle" may also encompass the UE and/or physical sensors equipped within the UE. The disclosure is not so limited, however, as UEs herein may likewise refer to any UE, whether carried by a user, integrated in a car, truck or train, or otherwise.

As a starting point to overcome these prospective rapid variations of the link quality of the communication systems operating at these higher frequencies due in part to LOS path blockages, manufacturers can equip the UE-based vehicle with one or a plurality of on-board sensors to provide fast radio network information to the base station. These sensors may include, among others, one or more cameras, Radio Detection and Ranging systems (RADARs), and Light Detection and Ranging systems (LIDARs). The sensors may be coupled to the UE in the vehicle to transmit sensing information relating to the communication environments in the relevant coverage area in addition to moving obstacles that potentially stand to block the LOS path and degrade communication quality.

In an aspect, perceptive wireless communications may be employed by the relevant network components. For example, upon receiving the sensing information provided by the vehicle sensors, a radio network can employ ML models to detect or predict prospective blockages and proactively initiate beam management and, where necessary, hand-off procedures.

While the various aspects may involve a plurality of vehicles communicating with the network, which in turn aggregates this information, for simplicity in some configurations, the disclosure refers to the relevant communications between a vehicle and a base station, for example, rather than several vehicles equipped with sensors and ML functions. The reference to a single UE-based vehicle is for simplicity and to avoid unduly obscuring the concepts herein. It will be appreciated by those skilled in the art in reviewing this disclosure, however, that a coverage area may involve communications with a plurality of UEs, in vehicles and otherwise.

Thus, in an aspect, an objective herein, such as in the context of millimeter wavelength signaling, is to gather sensing information from each equipped UE in the coverage area and leverage one or more ML models to predict beam blockages and best beams. Aspects of this disclosure are directed to, inter alia, addressing the problems of how an ML service entity may perform discovery of these UE-based vehicles that support sensor-based ML functions, and addressing how, if such ML service discovery can be effected, can an ML service session between the ML service entity at the ML server or base station and the vehicle-based UE be effectively established to enable the ML service entity to collect relevant sensing information for use in ML training, inference, and performance optimization. Additional aspects of the disclosure are also addressed herein.

The ML service entity, in addition to performing other functions, may be principally responsible for mediating UE/ML server communications and processing sensing information, extracted features, etc., to ultimately use dynamic and adaptive ML training and inferences to make beam predictions. For instance, the ML service entity may include one or more ML models to make predictions or inferences of beam blockages from received sensing information or may perform training of one or more ML models for predicting blockages. The ML service entity may reside in the base station. In other configurations, the ML service entity may reside in an ML server that is co-located with the base station, or located near the base station.

Other configurations involving alternative network deployments may in some instances affect the physical or virtual location of the ML service entity. One example of such a configuration includes a disaggregated network architecture, in which the ML service entity may be physically or logically deployed in a separate network node than those of a disaggregated base station. For example, the base station may include multiple units or network nodes, such as a central or centralized unit (CU), distributed unit (DU), radio unit (RU), or the like, and the ML service entity may be physically or logically separated from one or more of these network nodes.

More generally, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a base station (BS) (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
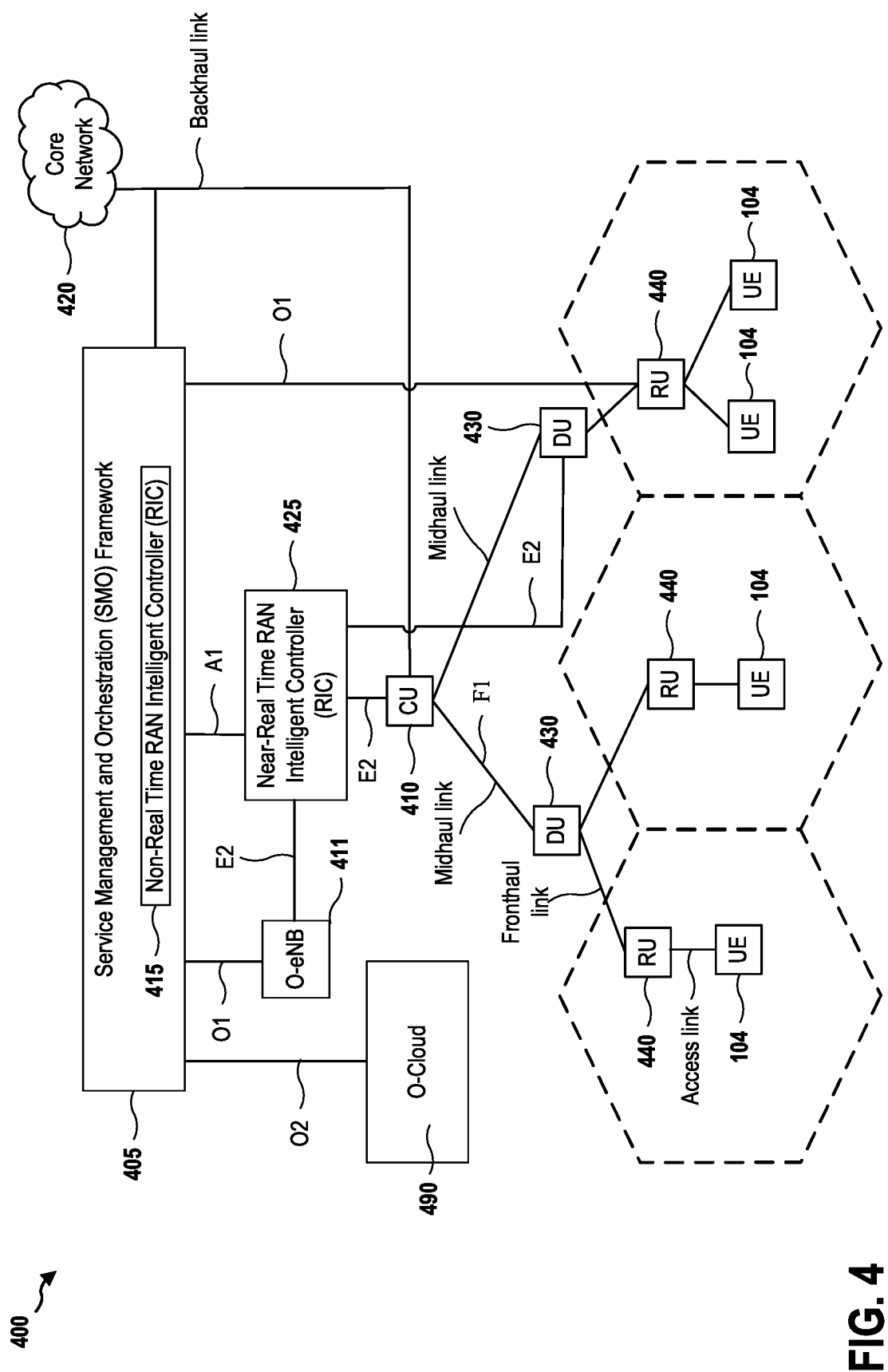
FIG. 4 is a diagram illustrating an example disaggregated base station architecture.

FIG. 4 shows a diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a Near-Real Time RIC 425 via an E2 link, or a Non-Real Time RIC 415 associated with a Service Management and Orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 120. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements, which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-Real Time RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include the Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-Real Time (RT) RIC 425. The Non-Real Time (RT) RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via 01) or via creation of RAN management policies (such as A1 policies).

Figure 5:
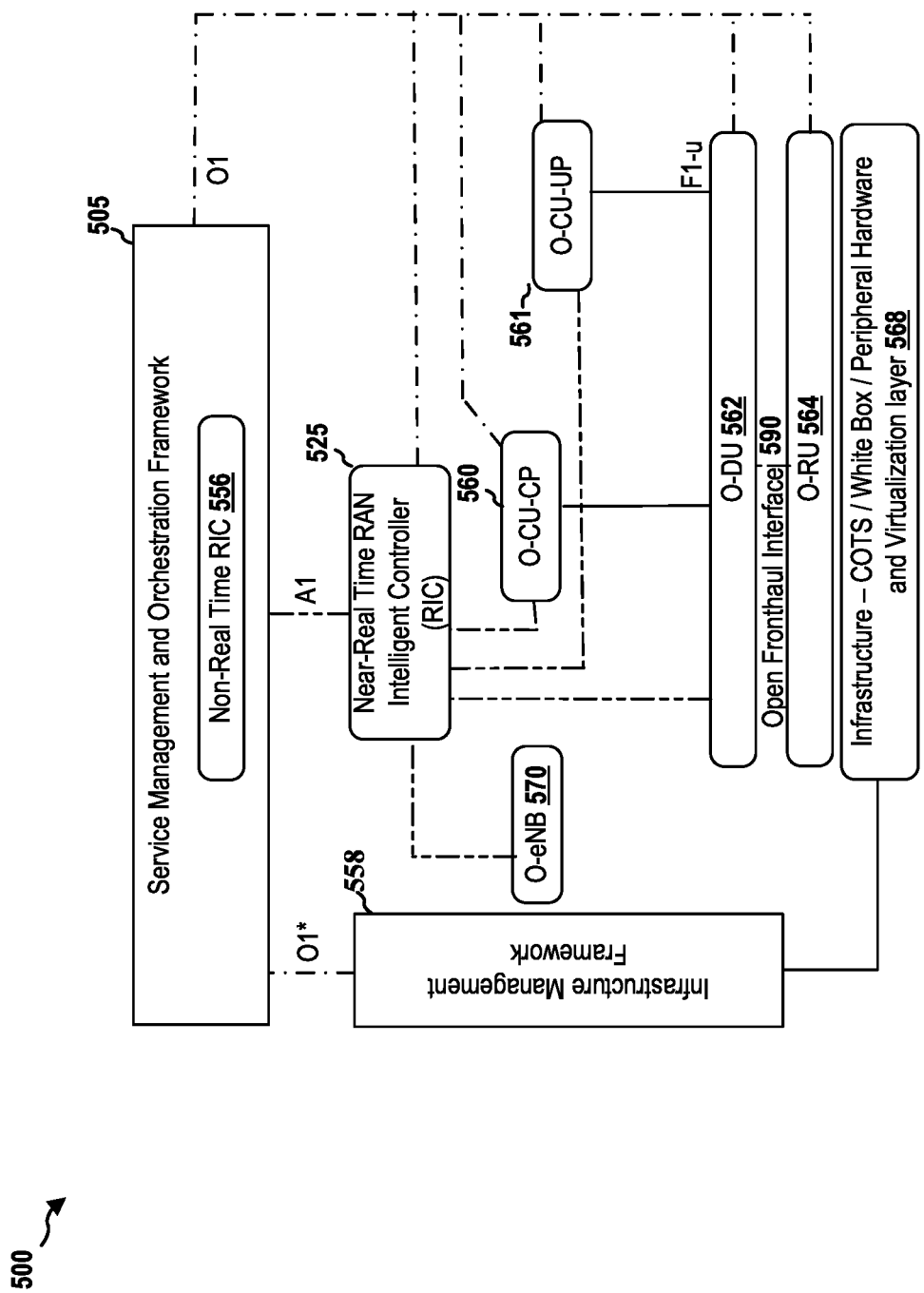
FIG. 5 is a conceptual diagram of an example Open Radio Access Network (O-RAN) architecture.

FIG. 5 is a conceptual diagram of an O-RAN architecture 500. O-RAN 500 beneficially provides an open architecture to which different network operators can link to provide a systematic, interoperable network. The conventional O-RAN architecture may be configured to include certain key functional elements. These include an SMO framework 505 (which may include a Non-RT RIC 556), as also seen in FIG. 4), an O-DU software component 562, a multi-RAT CU protocol stack (which may in turn include an O-RAN CU-CP (O-CU-CP) 560 and an O-RAN CU-UP (O-CU-UP) 561), a Near-RT RIC 525, an O-RAN eNB 570, an Infrastructure Management Framework 558, and an Infrastructure—Commercial Off The Shelf (COTS)/White Box/Peripheral Hardware and Virtualization Layer 568. Referring back to FIG. 4, SMO framework 505 may correspond to SMO framework 405, non-RT RIC 556 may correspond to Non-RT RIC 415, O-DU software component 562 may correspond to DU 430, O-CU-CP 560 and O-CU-UP 561 may correspond to functionality of CU 410, Near-RT RIC 525 may correspond to Near-RT RIC 425, O-RAN eNB 570 may correspond to O-eNB 411, and Infrastructure Management Framework 558 may be included in O-Cloud 490.

For simplicity and to avoid unduly obscuring the present disclosure, various inputs and outputs have been omitted from the architecture of FIG. 5, including signals to and from O-CU-CP 560 and O-CU-UP 561. The non-RT component 556 is capable of processing data offline or processing data quickly but typically greater than a threshold, such as one millisecond. Accordingly, the non-RT component 556 can process tasks for which there is not an immediate need for a response, but that may have a temporal allowance which makes the non-RT component 556 a natural choice to process the data.

One or more of these components may also interact with the radio unit (RU) hardware 564. For example, the O-DU component 562 may communicate with the O-RU component 564 via the open fronthaul interface 590. Components such as Non-RT RIC 556 and Near-RT RIC 525 may interact with the O-RU hardware 564 to assist O-RU 564 in running more efficiently and to optimize the O-RU 564 in real time as part of the RAN cluster to deliver a better network experience to end users. Both the Non-RT RIC 556 and the Near-RT RIC 525 may be used in connection with the service discovery and service session procedures due to their ability to process priority data at high speeds or in the background.

As discussed with reference to FIGS. 4 and 5, the Non-RT RIC 415, 556 includes several functions potentially relevant to the aspects herein. The Non-RT RIC 415, 556 includes functions such as configuration management, device management, fault management, performance management, and lifecycle management for all network elements. The Non-RT RIC 415, 556 can use data analytics, artificial intelligence (AI) and ML training and inference to determine the RAN optimization actions, for which it can leverage the service management and orchestration (SMO) framework 405, 505, including data collection and provisioning services of the O-RAN nodes.

The Near-RT RIC 425, 525 may utilize embedded processors or intelligent code for per-UE controlled load balancing, RB management, interference detection and mitigation, and other functions that are desirable to process in a prioritized manner in order to successfully use ML training/inference models. The Near-RT RIC 425, 525 may provide quality-of-service (QoS) management, connectivity management and seamless handover control. Near-RT RIC 425, 525 may also leverage the near real-time state of the underlying network and may feed RAN data to train the AI/ML models. The modified models can then be provided to the Near-RT RIC to facilitate high quality radio resource management for the subscriber.

In some configurations, the Near-RT RIC 425, 525 performs similar beam prediction management functions as the non-RT RIC 415, 556 for data that does not require near-RT priority. More often, due to the nature of its temporal priority, Near-RT RIC 425, 525 executes the different ML model and beam interference predictions for the different actors (such as, for example, the O-CU-CP 560, O-CU-UP 561, O-DU 562 and O-RU 564). The latter four components are functions with the base station, which four elements show the disaggregation of the elements in this architecture. Further, in this configuration, the Near-RT RIC 425, 525 is co-located with the gNB because it supports the loop delay in the inference operation, which is faster than 1 second.

The Non-RT RIC 415, 556, as noted, may support inference operations with a delay slower than 1 ms, and can be located near the gNB, such as being nearby in a cloud or edge server. In short, the Near-RT RIC 425, 525 or Non-RT RIC may act as an inference host in the beam prediction architecture, and in the disaggregated base station, the four actors 560, 561, 562 and 564 are portions of the gNB application.

In sum, with respect to the different prospective network configurations and server-based architectures described with reference to FIGS. 4 and 5, including the aggregated and disaggregated base stations, O-RANs, SMOs (including Non-RT RICs), Near-RT RICs or other network frameworks or modifications thereof, the principles of the present disclosure are intended to encompass any one or more of these implementations.

Figure 6:
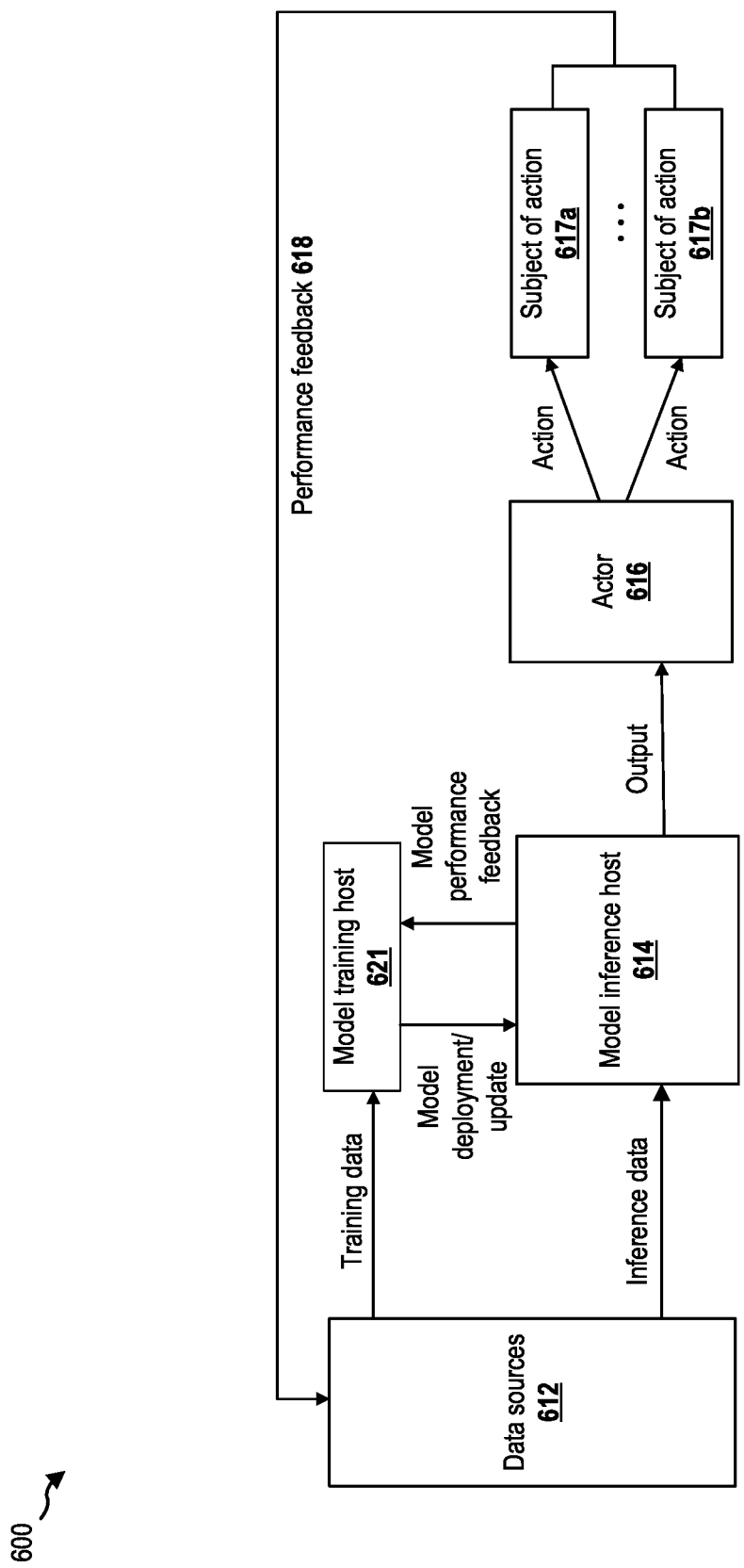
FIG. 6 is a flow diagram of an example training and inference model.

FIG. 6 is a flow diagram of an example training and inference model. Data sources 612 may include training and inference data collected from the network entities. A model training host 621 and a model inference host 614 may each be included in, or alternatively synonymous with, the Near-RT RIC 425, 525 and/or the Non-RT RIC 415, 556. Model deployments or updates from model training host 621 may be fed back to model inference host 614, and model performance feedback may be provided to the model training host 621. The training and inference output from model inference host 614 can be provided to an actor 616. The actor 616 may be any entity within the 3GPP network. For example, if the actor is the gNB, the subjects of action 617a and 617b could be updating the models, which in turn can be provided back to the data sources 612 as performance feedback 618. Other subjects of action 617a, b may include energy saving, load balancing, mobility management, coverage optimization, and the like. Actions that do not require near-real time treatment can be processed via the Non-RT RIC 415, 556. As noted previously, actions relating to establishing model and inference training based on sensor information (e.g., orientation bounding boxes (OBBs) to estimate objects locations, scales and orientations based on YOLO algorithm) and inference models is performed by an ML service entity.

Figure 7:
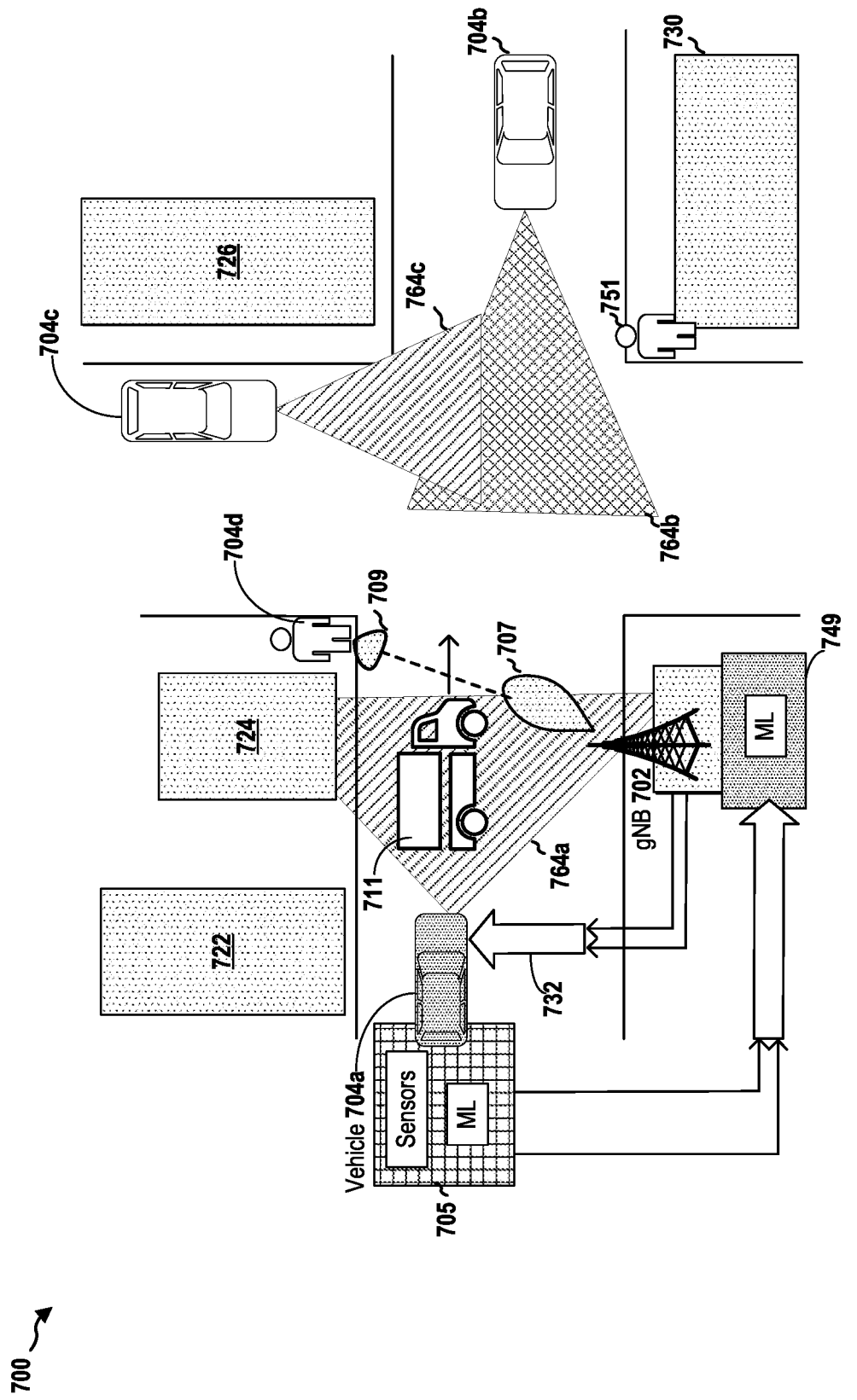
FIG. 7 is a top-down diagram of a coverage area for wireless communications using adaptive ML training and inference for beam prediction.

FIG. 7 is a top-down diagram of a coverage area 700 including wireless communications using adaptive ML training and inference for beam prediction. A vehicle 704a (which may be referred to as an "ego" vehicle) may enter a coverage area, e.g., a cell of gNB 702. The vehicle/UE 704a may be equipped with sensors, such as cameras, RADARs, and LIDARs. The gNB 702 may send a transmission 732 to the UE 704a requesting sensing information as the vehicle enters the area. Sensing information may include, for example, raw sensor data or inference data. Raw sensor data may include, for example, RADAR or LIDAR point clouds, camera pixels, and the like, which data is obtained directly from sensors of the vehicle/UE. Inference data may include, for example, orientation bounding boxes (OBBs) or other extracted features which the vehicle/UE 704a may derive as output from an ML model in a ML service entity 705 of the UE, based on raw sensor data. The ML model for extraction may be, for example, a neural network such as a multi-layer perceptron (MLP), a convolutional neural network (CNN), or a recursive neural network (RNN). The vehicle 704a may respond to the transmission 732 by sending the sensing information, which may serve as training data or inference data for beam blockage prediction. For example, training data is data that the ML service entity 749 of gNB may use to obtain or train a beam blockage prediction model, while inference data is data that the ML service entity 749 of gNB may use to predict beam blockages using the trained model. For instance, the ML service entity 749 of gNB may determine from the inference data that a feature exists in the LOS of a beam to the vehicle/UE 704a. The feature could be a wall or a pedestrian, for example.

A ML service entity 749 may be located in gNB 702, or co-located with the gNB or located near the gNB in a ML server, and include a model training host and a model inference host. The model training host includes a training model, such as a neural network, which generally determines and deploys weights for an inference model at the model inference host. The inference model may be, for example, a neural network that performs beam blockage prediction based on inference data received from UEs. For instance, the inference model at the ML service entity 749 may be a beam blockage prediction model. The inference host may provide output from the inference model to detect blocked beams. The output from the ML service entity 749 may be provided to an actor, such as the base station gNB 702. The ML service entity 749 associated with gNB 702 may also analyze the data and create gradients, and provide the gradients back to the model training host so that new weights can be provided and the training and inference models can be updated. Based on this performance optimization, new actions may also be performed at the gNB 702, such as changing the beam responsive to the information provided by one or more vehicles.

The coverage area 700 may include static objects, such as buildings, and moving objects, such as cars, buses, trucks, pedestrians, etc. The radio link quality between a UE and gNB can be impacted by both moving and stationary objects. For example, the gNB 702 may currently schedule to transmit a beam 707 directionally to a pedestrian UE 704d, the latter having a receive beam 709.

Referring still to FIG. 7, the ML service entity 749 may query vehicle UEs 704a, 704b and 704c for sensing information based on their sensors. The ML service entity 749 may instruct one of more of these vehicles to adjust the direction or orientation of the sensors, for example the field of views (FoV) 764a, 764b, 764c, in order to elicit more accurate feedback. The type of sensor of a UE may be changed. The ML service entity 749 may make these determinations based on the obstructions it discovers in the coverage area, including buildings 722, 724, 726, and 730, and pedestrians 751 and 704d. Based on the exchange of training and inference data exchanged and the models produced, the ML service entity 749 can change the pattern of beam predictions to reduce the chance of signal interference. For example, the ML service entity 749 may predict that truck 711 may enter the LOS of beam 707 to pedestrian 704d and cause a beam blockage, and the gNB may change to a different beam accordingly.

It should be noted that the above FIGS. 5-7 are shown as an example environment for some possible implementations in which aspects of the present disclosure can be applied. The illustrations also highlight the difference between base station monolithic architectures versus disaggregation. While the network architecture may differ in these cases, the principles of the disclosure are intended to apply with equal force to the different cases. Other network types are also possible and may be equally suitable for application of the principles herein.

Figure 8:
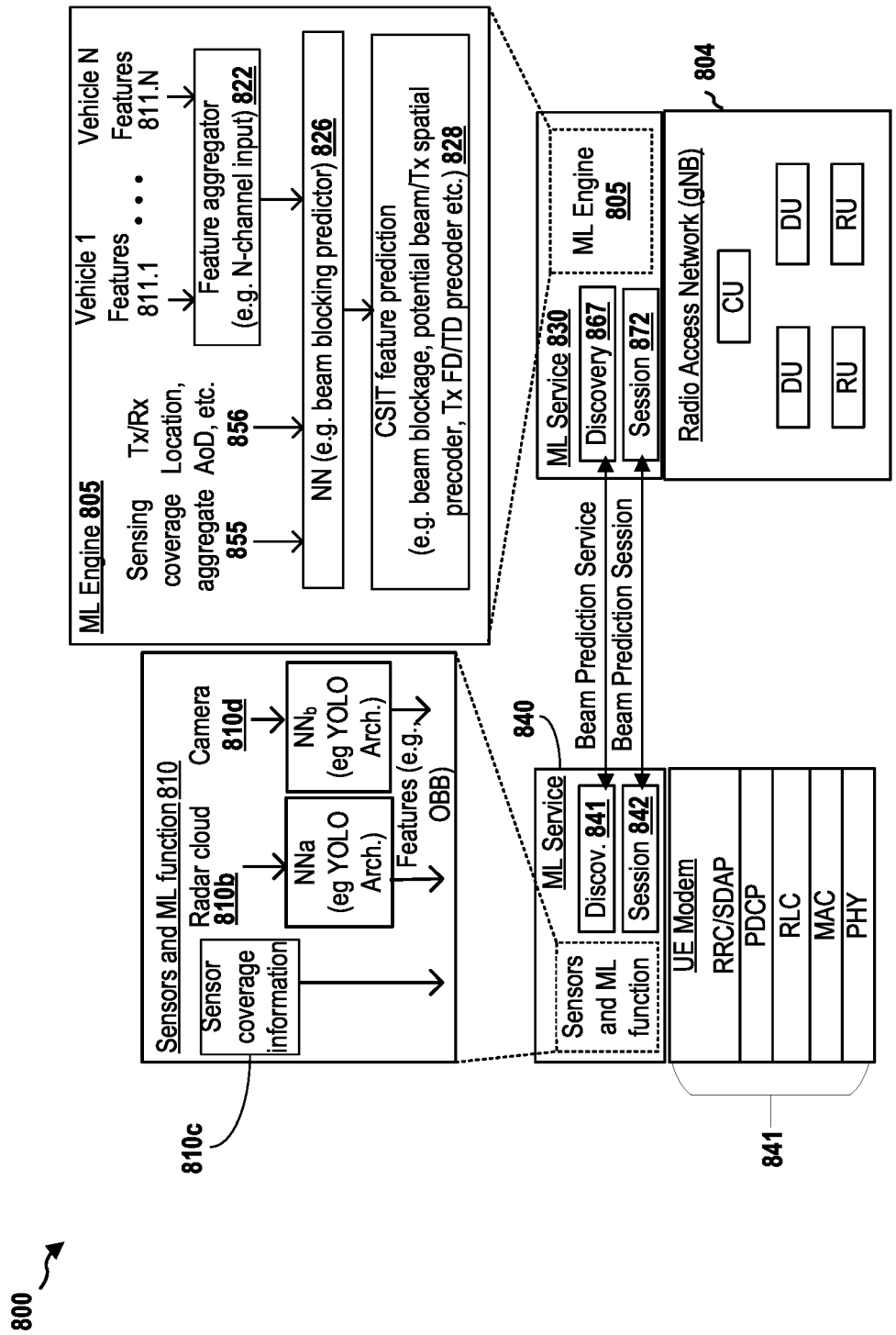
FIG. 8 is a diagram showing ML service entities at the ML server and the UE, respectively, using signaling procedures and parameters for service discovery and predictive service session establishment.

FIG. 8 shows a conceptual diagram 800 of an example of a ML service entity 830 interfacing with gNB 804 (or ML server) and a ML service entity 840 at the UE, respectively, and which applies signaling procedures and parameters for service discovery and predictive service session establishment. The ML service entity 840 at the UE generally assists in collecting sensing information and in communicating with the ML service entity 830 at the gNB or ML server. The ML service entity 840 at the UE includes sensors and one or more ML functions, an example of which is shown in blown up form as Sensors and ML function 810.

At sensor and ML function block 810 is a sensor coverage information component 810a which provides UE sensor parameters such as field of view, resolution, update rate, and the like. A radar cloud 810b system and a camera 810c are also shown in this example, in which the ML service uses a RADAR and camera together with an object detection or inference model (for example, based on a You Only Look Once (YOLO) architecture) incorporating neural networks $NN_a$ and $NN_b$, respectively. In particular, $NN_a$ and $NN_b$ respectively extract features such as OBBs from RADAR point clouds or camera pixels sensed by the UE. While the YOLO architecture is specifically referenced for the NNs in this example, it should be understood that the NNs are not limited to this architecture and may in other examples be based on other frameworks including but not limited to MobileNet and EfficientNet.

In order to make near-real time predictions about potential beam interference and performance degradations, there is a need in the art to establish a mechanism for ML service discovery. In one case, to obtain sensing data or extracted features from vehicles in a given coverage area, the ML service entity 830 must have a workable protocol that enables communications with the UEs to determine the types, if any, of sensors and other equipment that can contribute to beam predictions. In other words, the ML service entity 830 must be able to establish a session with the relevant UE to collect sensing information for both ML training and inference with the ML service entity.

Referring back to FIG. 8, the ML service entity 840 at the UE includes a discovery component 841 and a session component 842. ML Service entity 830 at the ML server or base station also includes a corresponding discovery component 867 and session component 872. These components or functions may exchange messages respectively for ML service discovery and ML service session establishment. Accordingly, in this aspect, ML service discovery is initiated by a communication from the discovery function 867 of the ML service entity 830 at the ML server or base station. Thereafter, an ML session such as beam prediction session can be established between session components or functions 872 and 842. Because the ML service discovery (e.g., whether the vehicle is even equipped with sensors or the required sensors in the first place) comes first, the ML session may be established after the ML service discovery. An ML session may include at least one of ML training or ML inference.

In the aspect shown in FIG. 8, the communication between the entities does not occur at a lower layer but may instead occur in some examples at a layer above the UE modem's protocol stack on the UE side, where the ML service entity 840 at the UE side is shown at a level above the protocol stack. The ML service entity 830 similarly executes functions in a layer above the RAN (gNB at 804, including in this deployment an exemplary hierarchy of one or more CUs, DUs and RUs) on the gNB side. Referring still to FIG. 8, the ML service entity 830 further includes an ML Engine 805 (or a plurality of such engines). A blown up version of ML Engine 805 is shown at the upper right of the figure. The ML Engine 805 can use data from a plurality of UEs in the coverage area to perform beam blockage prediction, provide feedback to the UEs, and perform beam management functions, making the desired changes where necessary.

In the upper right of the blown-up ML Engine 805, extracted features 811.1-811.N from multiple UEs 1-N respectively may be received into an N channel input 822 and aggregated. Collectively, the aggregated features provide a set of features or inferences at an instant in time. In part, they provide a basis for making a beam blockage prediction. The shape of the features may change over time as the vehicles and pedestrians move, and other dynamic events occur.

In addition, the UEs may provide aggregated sensing coverage data 855 (e.g., a combination of various UE sensor parameters) as well as location information 856 such as the UEs' transmit and receive locations, angle of departure (AoD), and the like. In addition to the features from the aggregator (the N channel input 822), the sensing coverage aggregated data 855 and the location information 856 are provided to an inference model including one or more neural networks (NN) 826, used for the beam blockage predictions. The output of the neural networks 826 with the aggregated data includes channel state information at the transmitter (CSIT) feature predictions 828 such as, for example, predicted beam blockages, potential changes to beam/TX spatial precoders, potential changes to Tx FD/TD precoders, etc. This information can be used to modify precoders and to change communications to avoid or mitigate beam blockage occurrences.

Accordingly, as is apparent from FIG. 8, in order to effect the desired outcomes of ML service discovery and ML session establishment, an initial communication link is required to elicit service discovery of sensors and ML models, and subsequent session data in which desired parameters can be obtained as described below.

Figure 9:
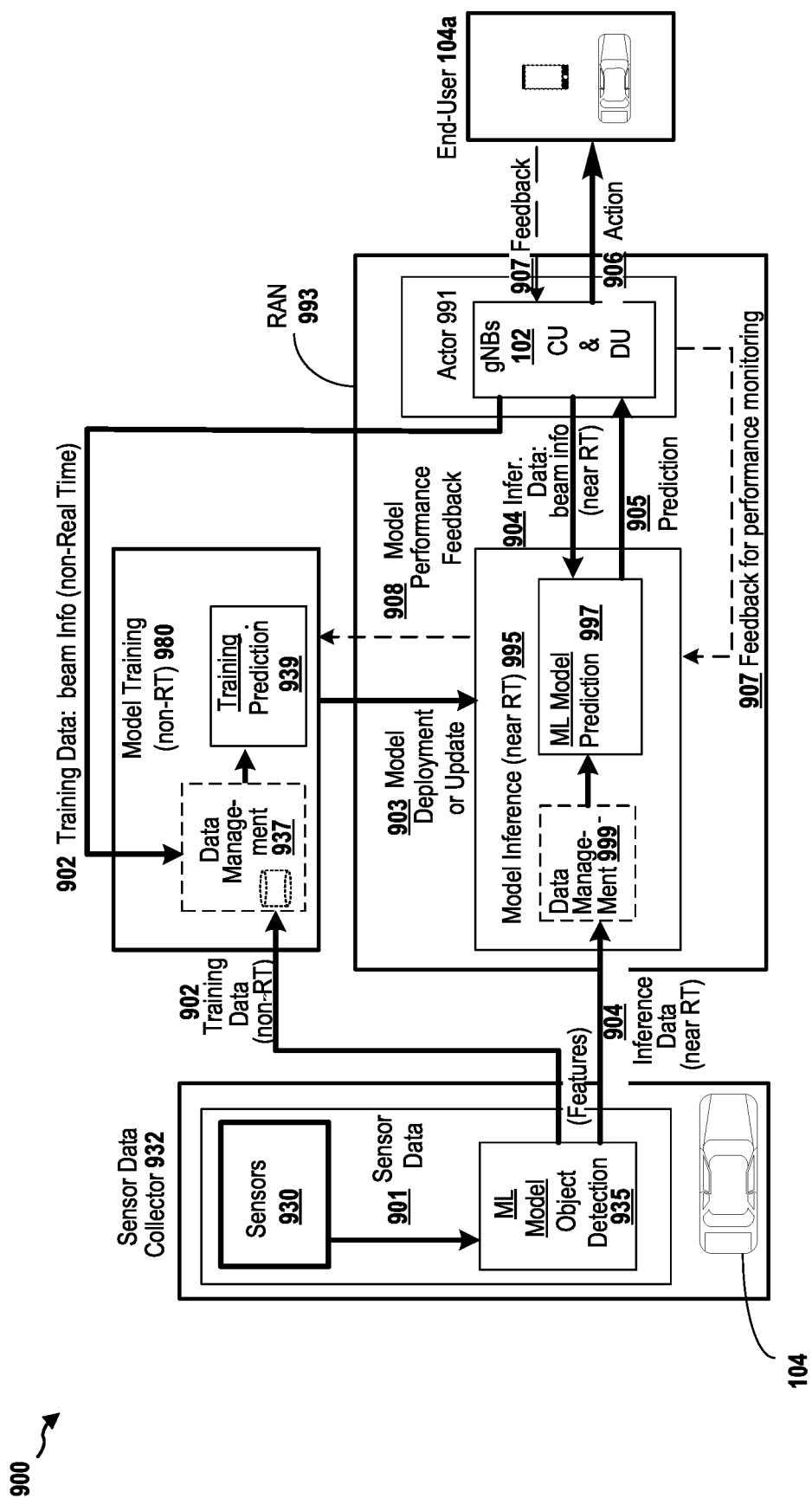
FIG. 9 is an example flow diagram of adaptive model training and inference functions for predicting beam blockages using a session based on the data gathered from the sensors and ML models of a UE.

FIG. 9 is an example flow diagram 900 of adaptive ML training and inference functions for predicting beam blockages using an ML session based on the data gathered from the sensors and ML models of a UE. In an aspect, the diagram 900 includes sensor data collector 932, model training (non-Real Time) component 980, RAN 993, and end user 104a. RAN 993 may include model inference (near Real Time) component 995, and an actor 991 such as a gNB 102 or other network node. In this example, model training (non-RT) component 980 may be a component of, or serve as, non-RT RIC 415, 556, and model inference (near RT) component 995 may be a component of, or serve as, near-RT RIC 425, 525. The sensor data collector 932 may include a UE-based vehicle 104 that is equipped with sensors 930 and one or more ML models 935 used for feature extraction.

At 901 the raw sensor data may be provided to the ML model 935 where object detection and feature extraction can be performed. At 902, the non-RT training data is submitted from UE 104 to the non-RT model training component 980 and stored/processed at data management module 937. The data is thereafter transmitted in sequence to training module 939 where predictions may be made for the non-RT data. Also, at or about the same time (902), training data such as non-RT beam information may be transmitted from the actor 991 (the gNB or network node (CU, DU, etc.) in a disaggregated base station) to the data management module 937.

The training data from the gNB/network node can be used with the training data from UE 104 to make predictions at training module 939.

Thereafter, at 903, the training component 939 of the non-RT model training 980 transmits the trained ML model to the near-RT model inference component 995, to deploy or update an ML model for inference. At 904, near-RT inference data from UE 104 is transmitted to the near-RT model inference component 995 and provided to a data management unit 999. Similarly, at 904, inference data including beam information (in near-RT) is passed from the actor 991 (e.g., the gNBs or one or more network nodes in the disaggregated configuration) to an ML model for predictions 997. At the near-RT model inference unit 995, the inference data at 999 and inference data at 904 are provided to the ML prediction model 997 to make beam blockage predictions.

At 905, the beam blockage predictions are provided to the actor 991. The action determined to be responsive to the prediction may be forwarded to the various end users 104a at 906 (including UE 104). The end users that receive the action data thereupon may provide feedback to the actor 991 at 907. Meanwhile, the actor 991 may provide feedback to the near-RT unit 995 for performance monitoring. The near-RT unit 995 forwards model performance feedback at 908, if necessary, to the non-RT training model 980 for use in the non-RT training and prediction unit 939.

It is noteworthy that, unlike the data sources 612 in the example of FIG. 6 in which training or inference data is internally collected, in this configuration, the data is externally collected from the sensors. Thus, instead of having a data reservoir which stores internally-collected data, the vehicle UEs 104 equipped with sensors act as data collectors. In this example, the actor 991 in FIG. 9 can be the gNB, for example, and the subject of the action may be instructing the UEs 104 to change beams or to use a different sensor, etc. In another aspect, the actor could be a network node—CU, DU, or some combination thereof—in an O-RAN.

FIGS. 10a-b are diagrams illustrating an example of UE-initiated ML service discovery between a UE and the ML server according to an aspect of the disclosure. In this configuration as shown below, the service discovery session may transpire directly between the UE and the ML server, thereby obviating the need to communicate directly with the base station, which may be advantageous in contexts where the ML server is not physically located within the base station, or the base station has been disaggregated. In FIG. 10a, UE 104 is shown under the coverage of an ML server 1002 (collocated or near a base station or a network node in a disaggregated O-RAN architecture), including ML service entity 1050. The ML service entity 1050 may further include a discovery component 1067 and ML engine 1005, as described in previous configurations.

As in those prior configurations, the UE 1004 may be a vehicle equipped with ML service sensors and ML functions 1006, and a discovery component 1041 for effecting communication in a UE based ML service entity 1040. The units 1006 and 1041 may be included within the ML service entity 1040 at the UE 1004. The arrow between the respective discovery modules 1041 and 1067 may be indicative of the ML service discovery procedures in step 10b.

Referring now to FIG. 10b, an example 1001 of a call flow diagram is shown involving an ML service discovery between UE 1004 and ML server 1002. In this aspect, an ML service discovery between a UE and an ML server may be initiated by the UE 1004. At 1010, when the UE 1004 enters the coverage area of the ML server 1002, the UE 1004 may use its discovery module 1041 to send a registration request with its identification and ML service support to the ML server 1002. Upon receiving the registration request, the ML server 1002 sends a registration acknowledgement at 1020 to the UE 1004. In an aspect, the ML server 1002 also sends at 1020 sensor information and an ML model inquiry relating to the ML service capabilities of the UE 1004.

Having received the registration acknowledgment at 1020, the UE 1004 at 1035 proceeds to send to the ML server 1002 its ML service capability including sensors, ML models, and object tracker parameters, as applicable, to the ML server 1002 so that the ML server 1002 can identify the suitable configuration to the sensors and ML models of the UE/vehicle 1004. In this ML service capability information, the sensors, ML models, and object tracker "parameters" are data that provides the ML server 1002 with sensor information as to the type, identification, nature, configuration, position, orientation, capabilities and limitations of the equipment and associated ML algorithms for extracting features from the sensor data. This may be in lieu of sending actual measurement values obtained by the sensors, since this process is limited to discovery rather than commencement of the sensor gathering and ML training and inference-related processes.

While these sensor parameters may vary widely depending on the sensors used by the UE and the features extracted with an ML model, some non-exhaustive examples are discussed below. It should be understood that these parameters are exemplary in nature and other or different information may be sent depending on the application.

Exemplary sensor parameters may include, depending on the configuration:

RADAR sensor parameters—These may include Sensor identification: e.g., # of RADAR sensors and associated IDs; Sensor mounting with in vehicle: e.g., positions relative to the center of ego vehicle and mounting rotation angle (roll, pitch, yaw); Detector configuration: e.g., angular field of view, range limit (min and max detection range); range rate limit (min and max range rate); detection probability, false alarm rate, range resolution, angle central band frequency; Detector reconfiguration: e.g., specify the parameters that can be reconfigurable; Measurement resolution and bias: e.g., azimuth, elevation, range, range rate resolutions and azimuth, elevation, range, range rate bias.

Camera parameters—These may include sensor identification: e.g., number of camera sensors and associated IDs; Sensor mounting with in vehicle: e.g., positions relative to the center of ego vehicle and mounting rotation angle (roll, pitch, yaw); Detector configuration: image size produced by the camera, camera focal length, optical center, radial, and tangential distortion coefficients.

Feature extraction ML model related parameters used by sensors—These parameters may include Model information: model name (e.g., YOLO) and version (e.g., YOLOv3), sensor input: (e.g., camera), and purpose (e.g., YOLOv3 for producing object bounding boxes (OBBs); Model architecture, e.g., for YOLO, all parameters associated neural network (NN) layers, including Input dimension, e.g., 128× 128×2, Layer parameters: Type of the layer (convolution layer, fully connected layer, pooling layer, dropout layer, activation layer), Size of the layer (for fully connected layer), Kernel for convolutional layer, including kernel size (e.g., 3×3), stride size (e.g., 2), w/o padding, and number of channels, Type for pooling layer, e.g., maximum or average pooling; Type of activation function, e.g., Sigmoid or ReLU activation; Dropout rate, e.g., 0.2 for Dropout layer; Model weights: Purpose, e.g., inference or initial weights for training, Model storage format and precision: e.g., protobuffer or JSON, 8-bit or 16-bit, Weights with specific storage formats, and Parameters for training: (Training type: offline or online, Data sets: train/validation/test data split, Hyperparameters for training: training batch size, epochs, learning rate or learning rate scheduling, regularization weights, dropout probability)

Tracker parameters—These parameters may include Sensor input required: e.g., RADAR sensor, GPS, and IMU; Tracker capability: single vs multi-object tracker, maximal number of objects that can be tracked; Tracker output format; Tracker configuration: type, state and measurement representation, motion and measurement models, threshold for track confirmation and track deletion, and track update rate.

After receiving the message 1030 with the ML service capability information, the ML server 1002 may send an acknowledgment 1040 to the UE 1004, and this aspect of service discovery may be completed. Notably, in this aspect, service discovery can be conducted directly with the ML server 1002 using the discovery components 1041 and 1067 at the UE 1004 and the ML server 1002, respectively.

Service discovery may also take place between the UE 1004 and the ML server 1002, as in FIGS. 10a-b, but in other aspects it may be ML server initiated.

Figure 11:
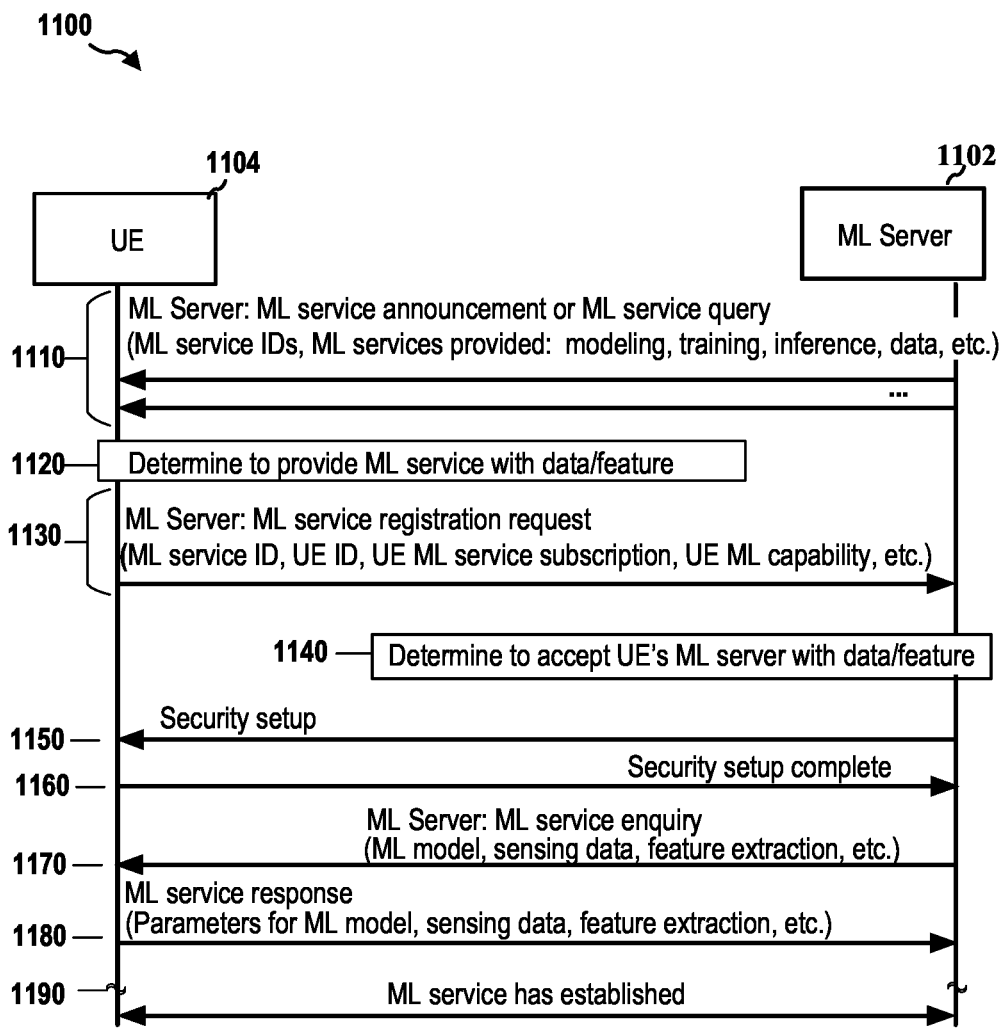
FIG. 11 is a timing diagram of an example of an ML server-initiated ML service discovery between a UE and the ML server.

FIG. 11 is a call flow diagram 1100 of an example of an ML server-initiated service discovery between a UE 1104 and the ML server 1102. Referring initially to the signals 1110, the ML server may send an ML service announcement or an ML service query, such as via a broadcast. The announcement or query may include, for context for the UE 1104, ML service information such as ML service IDs, the types of ML services provided, the modeling used, and other relevant parameters describing the training, inferences, types of data, and the like. Depending on factors like the amount of information sent, the ML server 1102 may transmit one, two, or more signals from time to time, as shown by the arrows in 1110.

Thereupon, a UE 1104 receiving the announcement or query transmission via a discovery component 1041 (FIG. 10a) may review the parameters received and, depending on the equipment in the UE 1104, may determine at 1120 to provide the ML service with the sensor data or extracted features, or a selected portion thereof. Thus, at 1135, the UE 1104 may send a message, from the discovery component 1041 (FIG. 10a) to the discovery component 1067 (FIG. 10a) at the ML server 1102, for an ML service registration request. The registration request 1130 may include the ML service information for which the UE 1104 is capable of providing assistance, such as the ML service ID, the UE ID, the UE ML service subscription, the UE's ML capabilities, and other information as applicable to the announcement or query 1110 and the UE's determination 1120. Since the connection is not yet secure, the level of detail of the information may be more general than otherwise exchanged under a secure transmission setup.

Referring still to FIG. 11, the ML server 1102 may determine at 1140 to accept the UE's ML service with some or all of the identified data or extracted features. Accordingly, the ML server 1102 may provide a security setup message at 1150. The UE 1104 may respond at 1160 with a security setup complete message, so that now the ML service entities can exchange secure information. At that point, the ML server 1102 may send to the UE 1104 a more detailed ML service enquiry at 1170 that may include specific information such as the ML model, sensing data, feature extraction capabilities, etc. In response, the UE 1104 may send at 1180 its own ML service response with the aforementioned list of some parameters that are relevant to the service query, including parameters for the ML model, data identifying the type, configuration, and number of sensors, feature extraction data, and the like. At this point 1190 both ML service entities have established the ML service provided from the UE 1104.

Figure 12A:
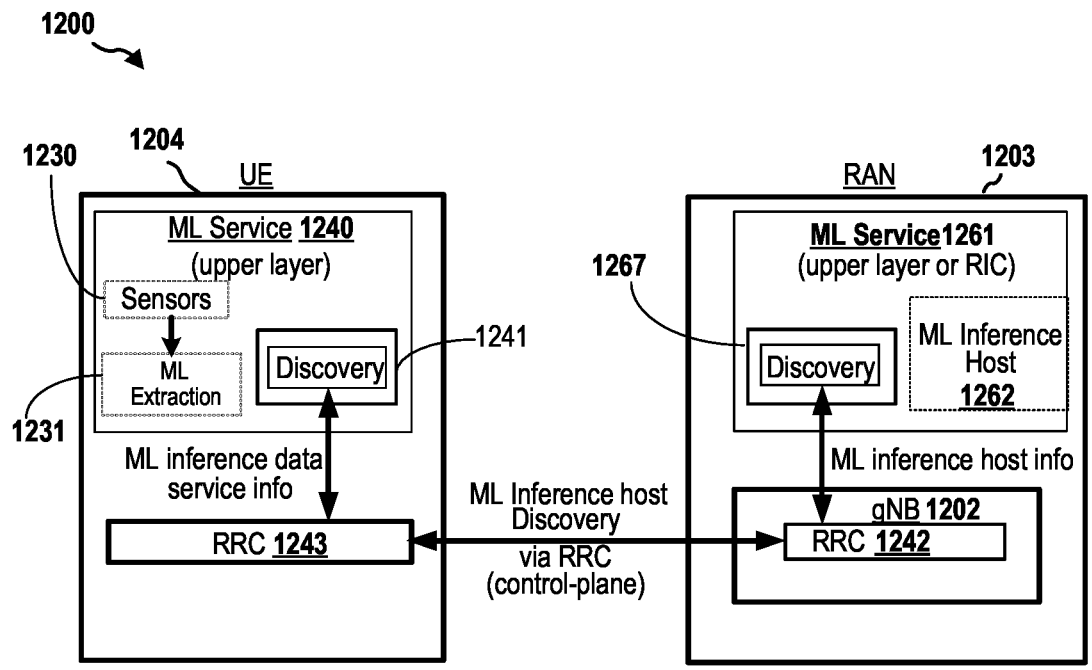
FIG. 12a is a conceptual diagram of an example implementation of UE-initiated ML service discovery with a base station or network node in a coverage area for beam blockage prediction at an RRC layer.

In yet another aspect of the disclosure, the UE may initiate service discovery, albeit in this case with the base station. FIG. 12a is an example 1200 of a hardware block diagram of UE-initiated ML service discovery with a base station or network node in a coverage area via control plan, e.g., an RRC layer. For example, a sensor-equipped vehicle (UE 1204) may enter the gNB 1202 coverage area and may trigger a set of signal procedures/exchanges with the gNB 1202 for sensing ML service discovery. In this configuration, the ML service entity 1240 of the UE 1204 resides in an upper layer. The ML service entity 1240 may include various components, such as one or more sensors 1230 for sensing data, a suite of the ML models 1231 for extracting relevant data from the sensors, and a discovery module 1241 for establishing a connection with the gNB 1202 via an RRC layer and transmitting information to that layer, as discussed below.

Referring still to FIG. 12a, the RAN 1203 includes an ML service entity 1261 with ML Inference Host 1262, e.g., within the RAN Intelligent Controllers 525 as in FIG. 5, in the upper layer. The ML inference host 1262 handles ML inference, for example, with one or more ML inference models. A discovery module 1267 may reside within the ML service entity 1261 on the upper layer for exchanging information with the RRC layer 1242 of the gNB 1202.

The implementation in FIG. 12a relates to ML service discovery that may occur via a cell acquisition with RRC messages on control plan, rather than a service-level procedure involving direct communication between the ML server (e.g., outside the gNB) and the UE, as discussed in the aspects above. For example, the configuration of FIGS. 12a-b may involve ML service discovery via cell discovery with the gNB 1202 that is co-located with or externally connected to the ML inference host 1262. In this case, RRC layers may be used for ML service discovery. These aspects note that some gNBs have ML service entities in their upper layers, while others may have ML service entities distributed with the other function units (e.g., the CU(s) or DU(s) of a disaggregated gNB). As such, in any of these case, the relevant service discovery signaling can be "pushed down" or "passed" to the RRC 1242 of the gNB 1202. For example, since the ML service entity 1261 with the inference host 1262 is located in the upper layer of the RAN or within the RIC or with the other unit of a disaggregated gNB, the UE may need to push or pass the ML service discovery information from the discovery component 1241 within the ML service entity 1240 to the RRC 1243 to enable the UE to provide ML service information to the inference host 1262 within the ML service entity 1261 over RRC messages, for example. Stated differently, in previous ML service discovery, the ML service discovery was with an ML server, whereas in this implementation such as in cell acquisition, ML service discovery is initiated via the RRC layer.

Figure 12B:
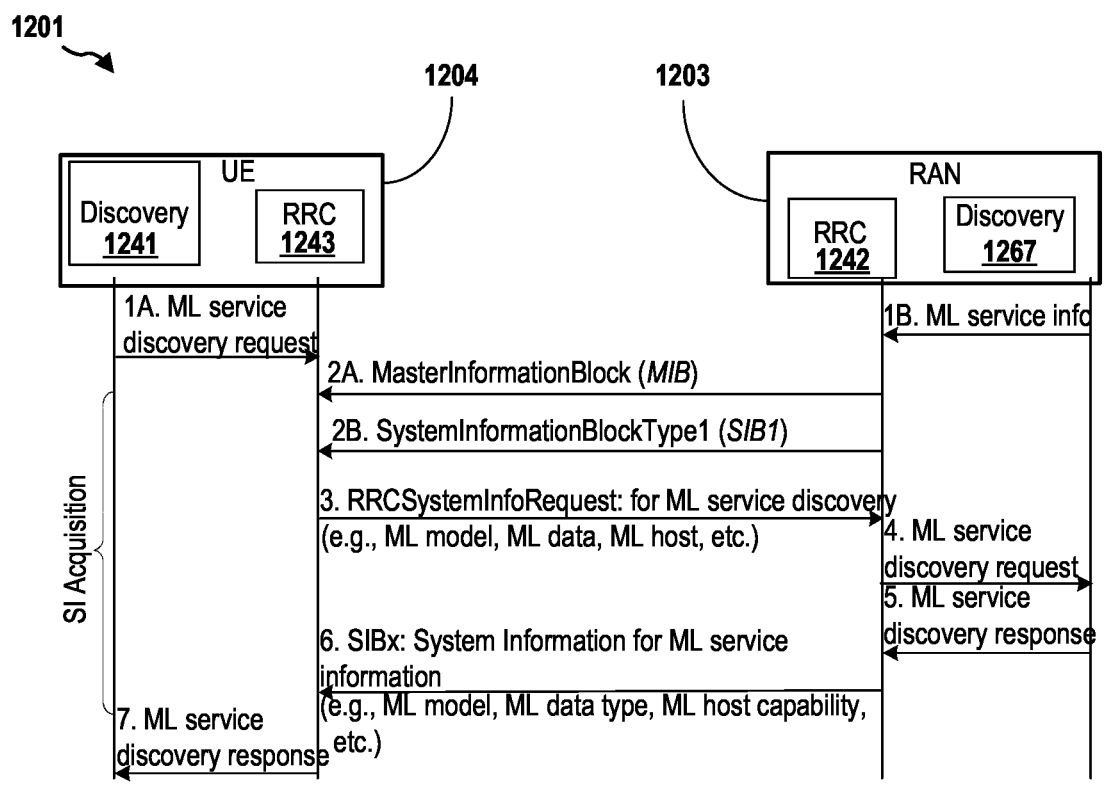
FIG. 12b is a timing diagram of the UE-initiated ML service discovery of FIG. 12a with a base station or network node using a dedicated system information block sent from the base station/network node.

FIG. 12b is an example 1201 of a call flow diagram of the UE-initiated ML service discovery of FIG. 12a with a base station or network node using a system information block sent from the base station/network node. At the UE 1204, the discovery component 1241 may send an ML service discovery request at 1A to the RRC 1242 (see also FIG. 12a). Similarly, at the RAN 1203, the discovery component 1267 may send ML service information over 1B to the RRC layer

1242. Meanwhile, the RAN 1203 may proceed to send a master information block (MIB) at 2A, and/or a system information block 1 SIB1 as the remaining minimum system information (RMSI) at 2B, and the UE 1204 may check if any ML service information is included in the MIB or SIB while acquiring the system information. Additionally or alternatively, the UE 1204 may then send at 3 an RRC system information request (such as the RRCSystemInfoRequest IE), but with this message, the IE may include an RRC request for ML service discovery, including in some aspects providing one or more ML models, ML data types, ML host information, and the like.

At 4, the ML service discovery request may be provided to the discovery component 1267 within the ML service entity 1261 at RAN 1203. Similarly at 5, the ML service discovery response may be provided back to the RRC 1242. In one aspect, at 6, the discovery response may be transmitted in a dedicated SIB block for ML service—in this example, called SIBx for purposes of this disclosure but is not limited to this name—which may include the system information relevant to the ML service information. Thus, the SIBx IE may include information relevant for ML purposes only in some implementations. This information may be sent as SIBx IE because it has to either broadcasted or a dedicated RRC message. At this point, the UE likely has not yet connected with the RAN, which may necessitate the broadcast nature of the message. At 7, the RRC 1243 at the UE 1204 provides this information to the discovery component 1241 within the ML service entity 1240.

Figure 13:
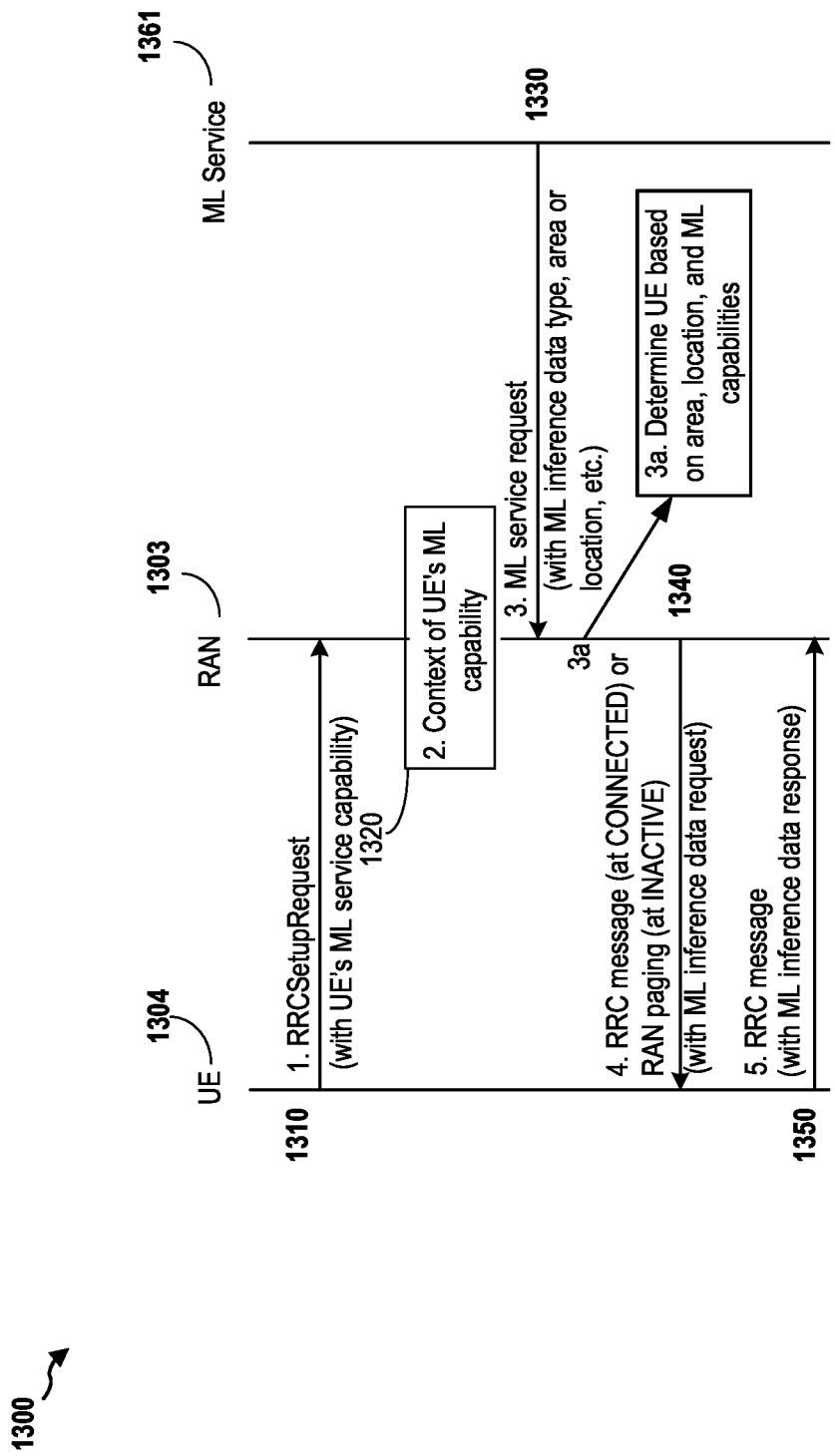
FIG. 13 is a timing diagram of a base station initiated ML service discovery between a UE, the base station and an inference host at the RRC layer.

FIG. 13 is an example 1300 of a call flow diagram of a base station initiated ML service discovery between a UE 1304, a RAN 1303 or base station, and an ML service entity 1361. In this implementation, the UE may initiate a connection to a base station with the indication of its ML service capability. The example illustrated in FIG. 13 involves interaction between the UE 1304, the RAN 1303, and the ML service entity 1361. At 1310 which corresponds to a first step, the UE may send an RRC setup request (such as an RRCSetupRequest IE) to RAN 1303. The request may include the UE's ML service capabilities. Thereafter, at 1320, the RAN 1303 may at 2 store the context of the UE's ML service capabilities. The ML service entity 1361 may at 1330 send the RAN 1303 an ML service request (e.g., ML inference data request) at 3 (e.g., including an inference data type, area, location, etc.). The RAN 1303 may determine the candidate UE for providing the requested ML service based on the coverage area, the UE location, and the UE's capability information stored at 2, for example, as shown at 3a. At 1340, the RAN may send at 4 an RRC message (if the determined candidate UE (s) is in an RRC connected mode) or a paging message (if the determined candidate UE(s) is in an RRC inactive or idle mode) including the ML service request (e.g., ML inference data service request). The UE may respond at 1350 in a fifth step (at 5) with an RRC message with a response including the information of ML service with inference data.

Figure 14:
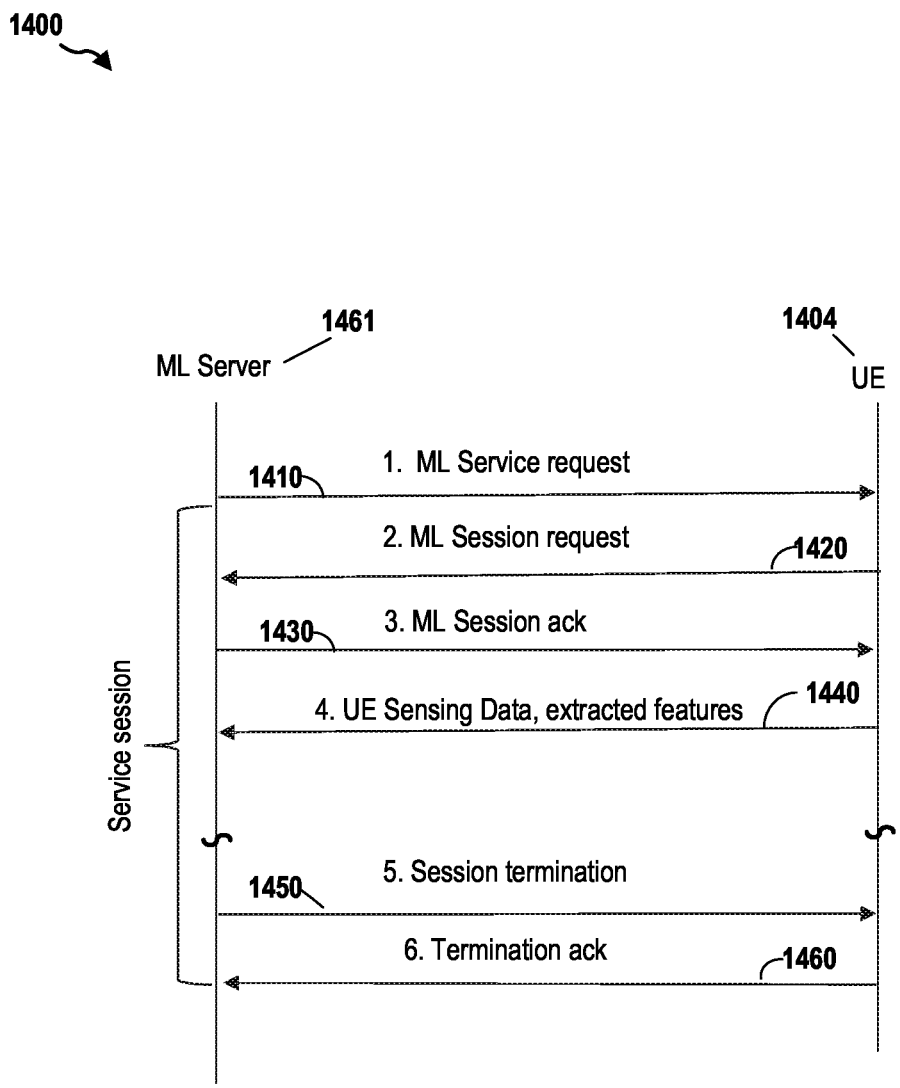
FIG. 14 is a timing diagram of an ML service session between an ML server and a UE.

FIG. 14 is a call flow diagram of an example of a ML service session procedure 1400 between an ML server 1461 and a UE 1404. After the completion of the service discovery, the Session function of the ML service entity at the ML server 1461 may start an ML service session establishment procedure. At 1410, the ML server 1461 may send an ML service request to the vehicle/UE 1404. The types of ML service may include, by way of example:

Requiring a particular sensor to perform a specific ML task, e.g., front RADAR sensor to perform an inference task using YOLOv3 models to produce OBBs at 10 Hz. Depending on the nature of the tasks, the parameters sent or request may include (i) sensor parameters: sensor(s) ID(s) and mounting locations, (ii) Data collection parameters: number of training samples/data collection rate and duration, ground truth generation, and train/validation/test split, (iii) Model parameters: e.g., for inference task model version and trained weights; for training tasks, training model and initial weights, model hyperparameters; (iv) Training related parameters: training epochs, batch size, learning rate, metric, and early stopping threshold, and (v) Output parameters: e.g., for inference task: output format and update frequency; for training task: trained weights and accuracy metrics.

If a sensor is reconfigurable, gNB can require the reconfiguration of a sensor: e.g., set the azimuth and elevation angle of front mounted RADR to certain degrees; change the output resolution of front mounted camera. The previous two requests can be combined in sequence: e.g. Change the field of view of front mounted RADAR sensor first and then perform inference task using YOLOv3 to produce bounding boxes at 10 Hz. After receiving the ML service request at 1410, the UE may send a request to establish a service session between the UE and the ML server, at 1420. Next, at 1430 after receiving the ML session request, the ML server may send an acknowledgment of the ML session request. At 1440, the UE may proceed to send sensing information. The sensing data can be raw data or extracted features per the guidelines of the service request. In some configurations, it can be more desirable for the UE to send the extracted features to reduce the potentially significant communication overhead that may be incurred by requiring the UE to send all relevant sensor measurements. The exchange of sensor, training, inference data, etc. may continue until the ML server terminates the session at 1450. The termination may be followed the UE refraining from sending further data and by sending an acknowledgment from the UE at 1460.

Figure 15:
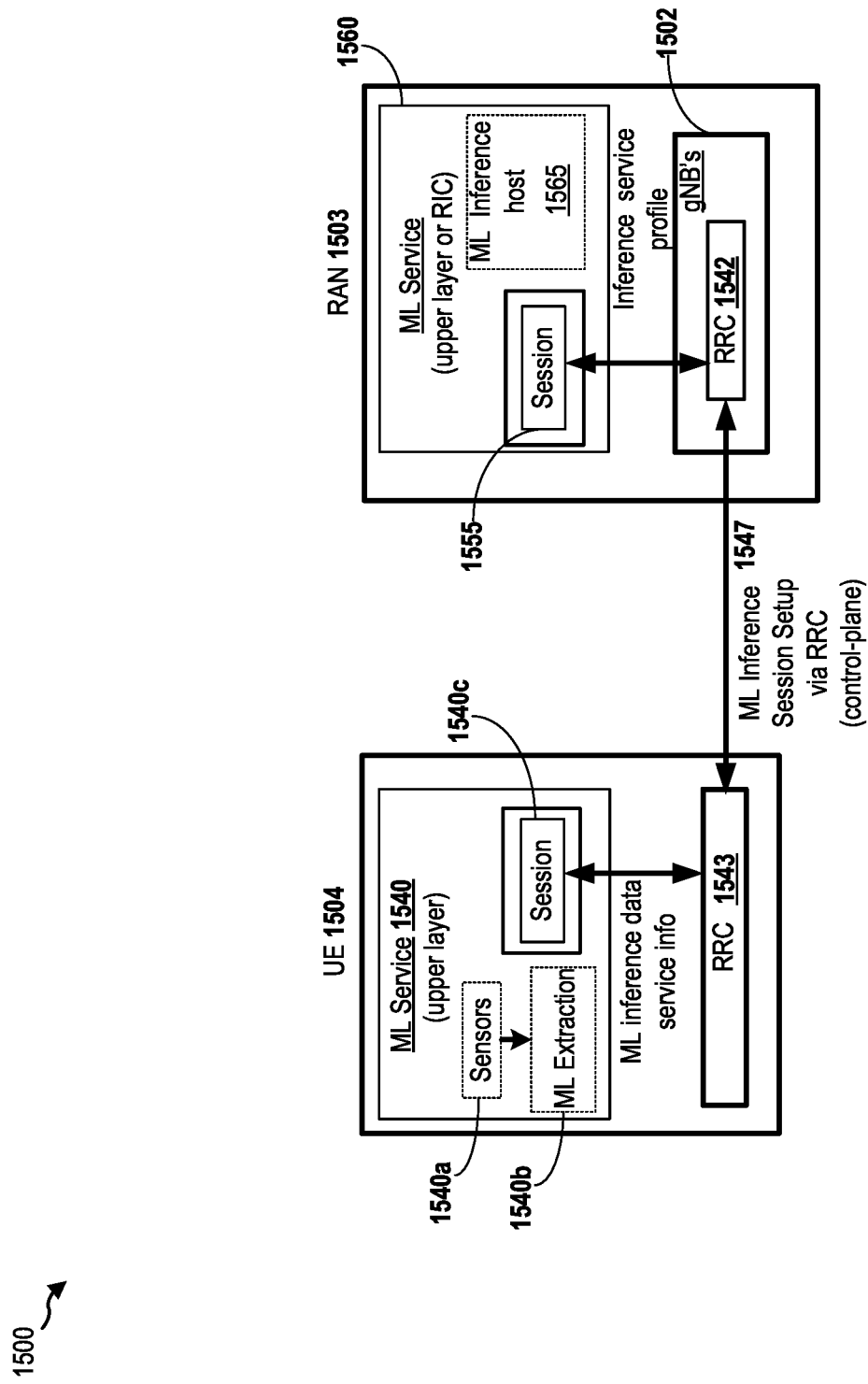
FIG. 15 is a conceptual diagram of an example implementation of an ML service session between a UE and a base station in a radio access network (RAN).

FIG. 15 is an example of a system implementation 1500 of an ML service session between a UE and a base station in a radio access network (RAN). FIG. 15 is similar to the block diagram of FIG. 12a. That is, in lieu of establishing ML service session (e.g., an ML inference data service session) between the UE's ML service entity 1540 and the ML service entity 1560 at the RAN 1503, the RRC layer may be used to provide message exchanges between UE's ML service entity 1540 and the ML service entity 1560 at the RAN 1503. An example of this aspect is a UE establishing a connection with a base station.

The left block may include a UE-equipped vehicle 1504, e.g., entering the service area of the right block, or the RAN 1503. Referring to the UE 1504, the UE is partitioned into an upper layer 1549 which may include an ML service 1540 residing at the upper layer. The UE may further include a plurality of sensors 1540a, ML extraction features or raw data that may be extracted from the sensors at ML extraction component 1540b, and a session component 1540c for use in bidirectional communications to and from a lower RRC layer 1542. The RRC layers may communicate information, such as an ML Session Setup, via a bidirectional link 1547.

Referring to the RAN 1503, the corresponding upper layer 1549 may similarly include an ML service entity 1560 (which may be, for example, at upper layer or at a near-RT RIC) with the ML inference host 1565 for inference, and a session component 1555 for exchanging information, such as ML inference service profiles from the session 1555 within the ML service entity 1560 with the RRC layer on the network side. For example, the ML service entity 1560 may use the session component 1555 to send an ML inference service profile to the RRC layer 1542 of the gNB 1502 in RAN 1503.

Figure 16:
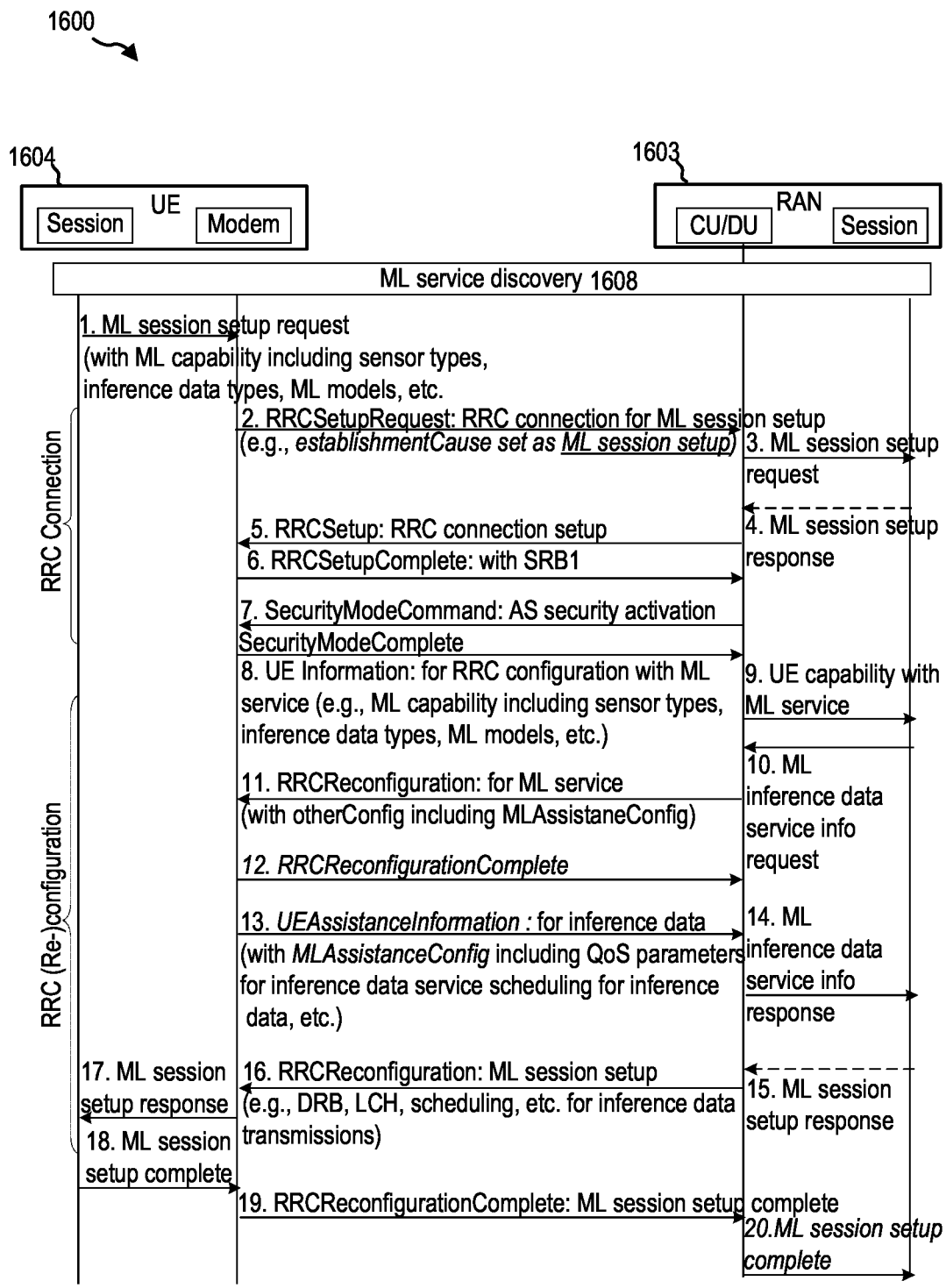
FIG. 16 is a timing diagram of the example implementation of FIG. 15 of an ML service session between the UE and base station in the RAN.

FIG. 16 is an example 1600 of a timing diagram of the implementation of FIG. 15 of establishing an ML service session between the UE 1604 and base station in the RAN 1603. The UE 1604 may include a modem for implementing previously described lower level functions, and a session component similar to that of FIG. 15. The RAN/gNB 1603 may include distributed network nodes shown as CU/DU component, as well as a similar session component. After ML service discovery 1608 has taken place, the session component at UE 1604 may issue at step 1 an ML session setup request to the RRC layer at the modem. This request may include ML capability including sensor types, inference data types, ML models, and the like. The modem can then use the RRC layer to send an RRCSetupRequest at step 2 to the RRC at a network node CU of the RAN 1603. This transmission may include an RRC connection for an ML session setup, including an establishmentCause set as ML session setup. At 3, the ML session setup request may be forwarded to the session component of the RAN 1603 to make it accessible to the upper layers. The session component of the ML service entity 1560 may, at 4, send an ML session setup response, which can be passed to the RRC at the network nodes CU of the RAN 1603. At 5, the RRC at the CU of the RAN 1603 sends over the RRC layer a standard RRCSetup IE, or RRC connection setup.

Referring still to FIG. 16, the UE may respond at 6 with an RRCSetupComplete message with signaling radio bearer (SRB) (e.g., SRB1). At 7, the RAN 1603 transmits a SecurityModeCommand IE for activating AS security, to which UE 1604 may respond by sending SecurityModeComplete. Now with a secure connection between the UE 1604 and RAN 1603, the UE at 8 may send UE information for RRC configuration with ML service (for example, this information may include detailed ML capability including sensor types, inference data types, ML models, and the like). At 9, the CU of the RAN 1603 may forward the UE ML capabilities to the session component within the ML service entity of the RAN 1603.

The session component within the ML service entity of the RAN 1603 (e.g., the near-RT RIC) may respond at 10 by transmitting to the RRC at the CU node of the RAN 1603 an ML inference data service information request, which in turn may be forwarded (11) over the RRC connection as an RRCReconfiguration IE for ML service. The request at 11 may include an otherConfig IE including MLAssistanceConfig. In Response, the RRC of the UE 1604 at 12 may forward an RRCReonfigurationComplete IE, followed at 13 by a UEAssistancelnformation IE including ML inference data service information (such as with an MLAssistanceConfig including QoS parameters for ML inference data service, scheduling for ML inference data, and other parameters depending on the implementation).

The ML inference data service response may be forwarded to the session component within the ML service entity of the RAN 1603 at 14. The session component within the ML service entity of the RAN 1603 may issue an ML session setup response at 15. The RRC at the CU node of the RAN 1603 may then transmit an RRCReconfiguration IE for ML session setup at 16. Relevant information with this request at 16 may include DRB information, LCH, scheduling, etc., to which the ML inference data transmissions may apply. At 17, the RRC of the UE 1604 forwards the ML session setup response to the session component within the ML service entity of the UE 1604. The session component within the ML service entity UE 1604 in turn may respond to the UE's RRC at 18, after which the UE may issue, at 19, an RRCReconfigurationComplete to indicate that the ML session setup is complete. This information can then be forwarded to the session component within the ML service entity of the RAN 1603 at 20.

Accordingly, FIGS. 15 and 16 include aspects that allow for an ML service session to be established between the UE and the gNB, for example, where the Near-RT RIC is implemented in the gNB or the UE is in the middle of establishing a connection with the network.

Figure 17:
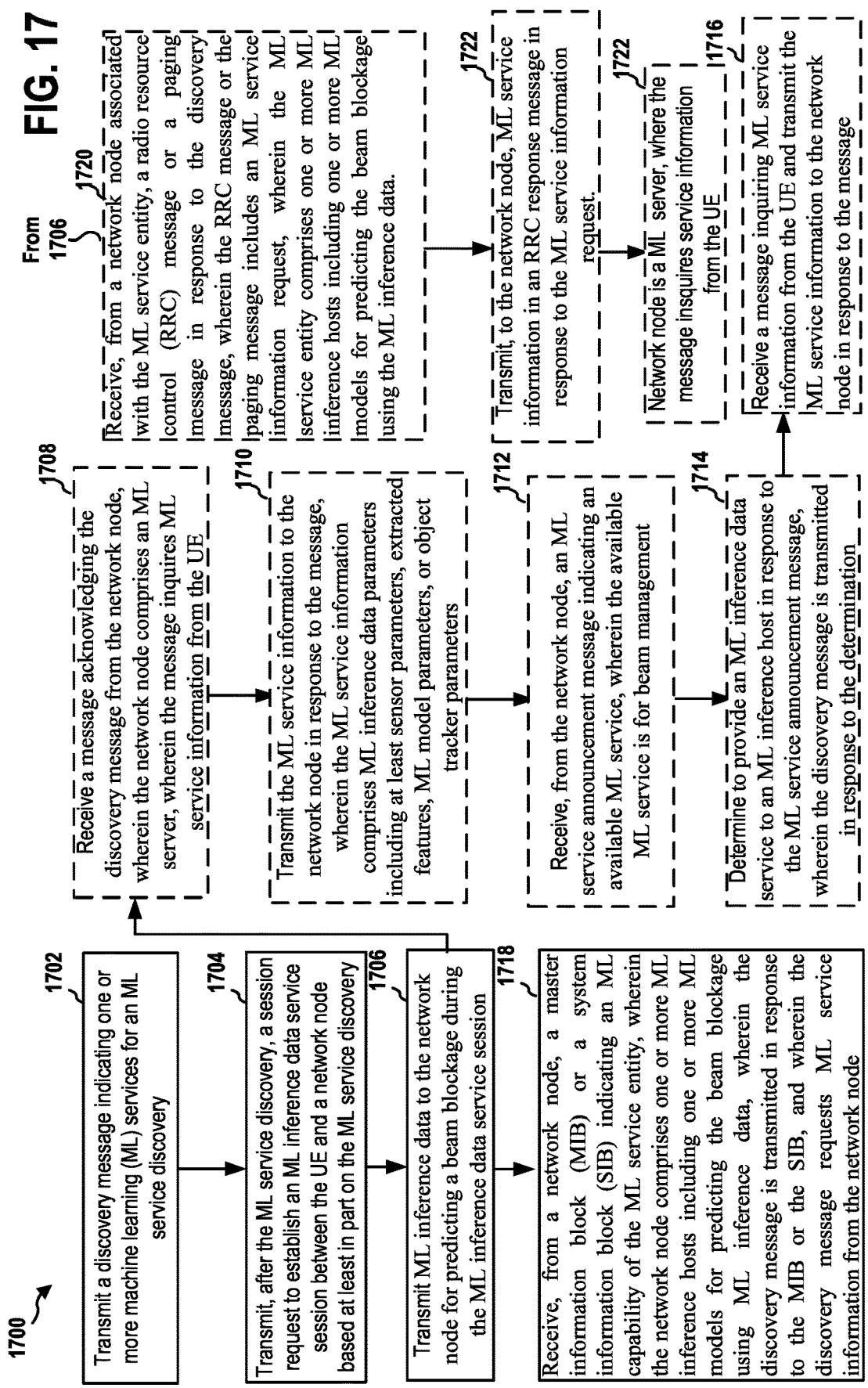
FIG. 17 is a flow diagram of wireless communications.

FIG. 17 is a flowchart 1700 of a method of wireless communication. The method may be performed by a UE including a pedestrian or vehicle-based UE; the UE (e.g., the UE 104 (FIG. 1); the UE 350; the vehicles 704*a*, 704*b*, 704*c*, the pedestrian UE 704*d* (FIG. 7); UE 1004, 1104, 1204, 1304, 1404, 1504, 1604, and 1704, and the apparatus 1902). The UE may in some cases be equipped with various sensors and processor-based models (e.g., ML features, inference features, sensor data, software, etc.), e.g., as shown in FIGS. 7-10*a*, FIG. 12*a* and FIG. 15. The dashed-line blocks in FIG. 17 correspond to optional techniques.

Referring back to FIG. 17, at 1702, the UE (e.g., a sensor-equipped UE) may transmit a discovery message indicating one or more machine learning (ML) services for an ML service discovery. At 1704, the UE may transmit, after the ML service discovery, a session request to establish an ML inference data service session between the UE and a network node based at least in part on the ML service discovery.

In some configurations, at 1708, the UE may receive a message acknowledging the discovery message (e.g. from the network node). At 1706, the UE may transmit ML inference data (e.g., to the network node) for predicting a beam blockage during the ML inference data service session. Referring to 1722, the network node may comprise an ML server, wherein the message inquires ML service information from the UE. Referring back to 1710, the UE may transmit the ML service information to the network node in response to the message, wherein the ML service information comprises ML inference data parameters including at least sensor parameters, extracted features, ML model parameters, or object tracker parameters. Thereupon, at 1712, the UE may receive, from the network node, an ML service announcement message indicating an available ML service, wherein the available ML service is for beam management.

At 1714, the UE may determine to provide an ML inference data service (e.g., to an ML inference host) in response to the ML service announcement message, wherein the discovery message is transmitted in response to the determination. At 1716, the UE may receive a message inquiring ML service information from the UE and transmit the ML service information to the network node in response to the message.

At 1718, the UE may receive (e.g., from the network node) a master information block (MIB) or a system information block (SIB) indicating an ML capability of the ML service entity, wherein the network node comprises one or more ML inference hosts including one or more ML models for predicting the beam blockage using ML inference data, wherein the discovery message is transmitted in response to the MIB or the SIB, and wherein the discovery message requests ML service information from the network node.

From 1706, at 1720 the UE may optionally receive (e.g., from a network node associated with the ML service entity) a radio resource control (RRC) message or a paging message in response to the discovery message, wherein the RRC message or the paging message includes an ML service information request, wherein the ML service entity comprises one or more ML inference hosts including one or more ML models for predicting the beam blockage using the ML inference data.

Figure 18:
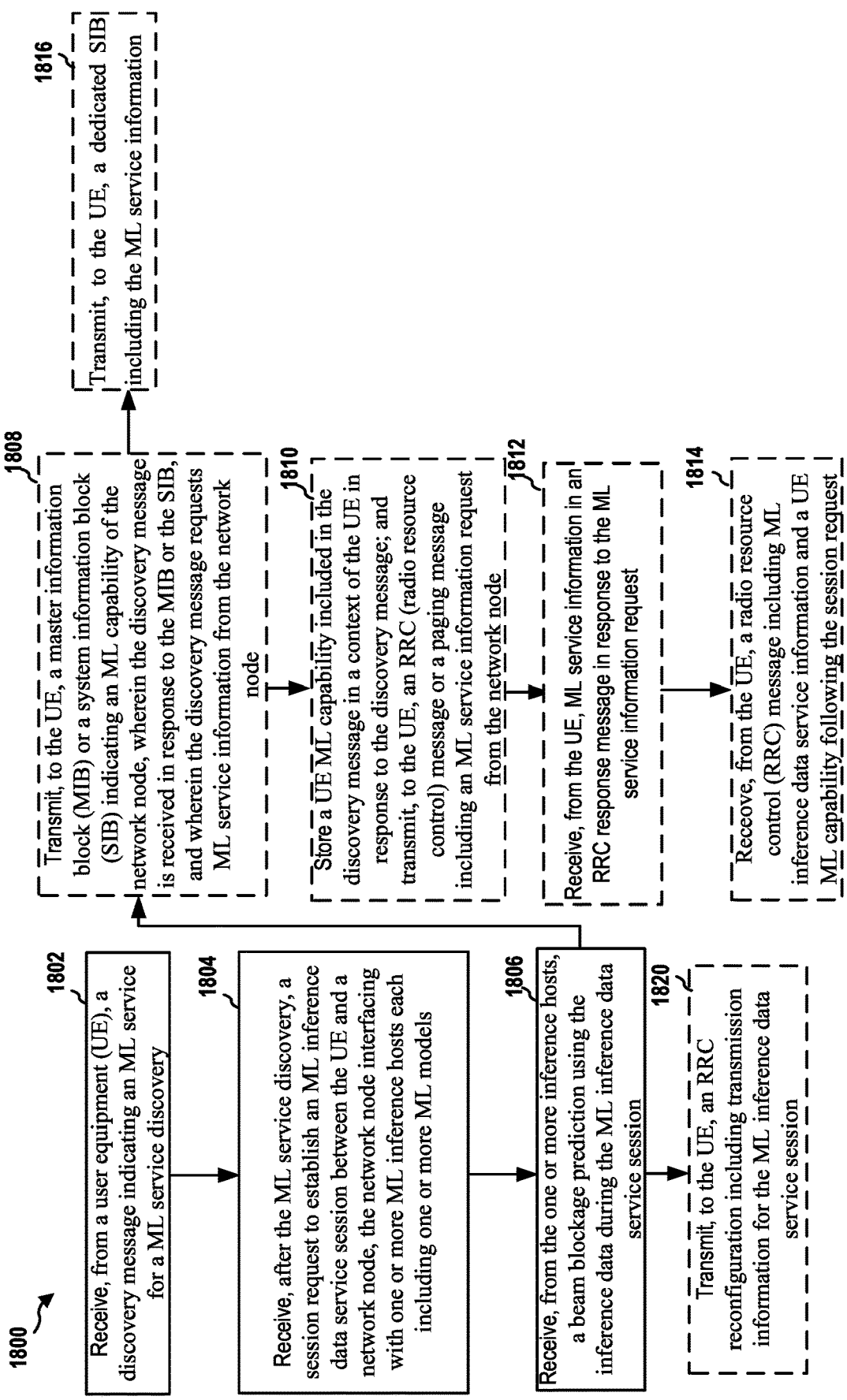
FIG. 18 is a flow diagram of wireless communications.'

FIG. 18 is a flowchart 1800 of a method of wireless communication. The method may be performed, depending on the context and network configuration, by a network node, such as a base station, an ML service entity at the base station, or an ML server co-located with the base station or near the base station. In disaggregated architectures, the method may be performed by one or more network nodes that may be physically or logically separated from the base station. These entities may include base station 102, 310 (FIG. 3), non-RT 405 and near-RT RICs (FIG. 4), ML server 749, gNB 702 (FIG. 7); RAN 993, non-RT module 980, BS/Network node 1002, ML server 1130, RAN 1203, gNB 1202, RAN 1503, ML Inference Host 1560; apparatus 2002. Depending on the context and configurations, any of these entities may contain one or more functions described in FIGS. 4, 8, 12, etc. The dashed-line blocks are optional in FIG. 18. The apparatus is referred to as an entity.

Referring still to FIG. 18, at 1802, the entity may receive (e.g. from a user equipment (UE)) a discovery message indicating an ML service for a ML service discovery. At 1804, the entity may receive, after the ML service discovery, a session request to establish an ML inference data service session between the UE and the network node, the network node interfacing with one or more ML inference hosts each including one or more ML models. Thereafter, at 1806, the entity may receive (e.g., from the one or more ML inference hosts) a beam blockage prediction using the inference data during the ML inference data service session. At 1820, the entity may transmit (e.g., to the UE) an RRC reconfiguration including transmission information for the ML inference data service session Referring to 1808, the entity may transmit (e.g. to the UE) a master information block (MIB) or a system information block (SIB) indicating an ML capability of the network node, wherein the discovery message is received in response to the MIB or the SIB, and wherein the discovery message requests ML service information from the network node. Following 1808, to the right of the flowchart at 1816, the entity may transmit (e.g., to the UE) a dedicated SIB including the ML service information.

At 1810, the entity may store a UE ML capability included in the discovery message in a context of the UE in response to the discovery message; and transmit, to the UE, a radio resource control (RRC) message or a paging message including an ML service information request from the network node. At 1812, the entity may receive (e.g. from the UE) ML service information in a RRC response message in response to the ML service information request. At 1814, the entity may receive (e.g. from the UE) an RRC message including ML inference data service information and a UE ML capability following the session request.

Figure 19:
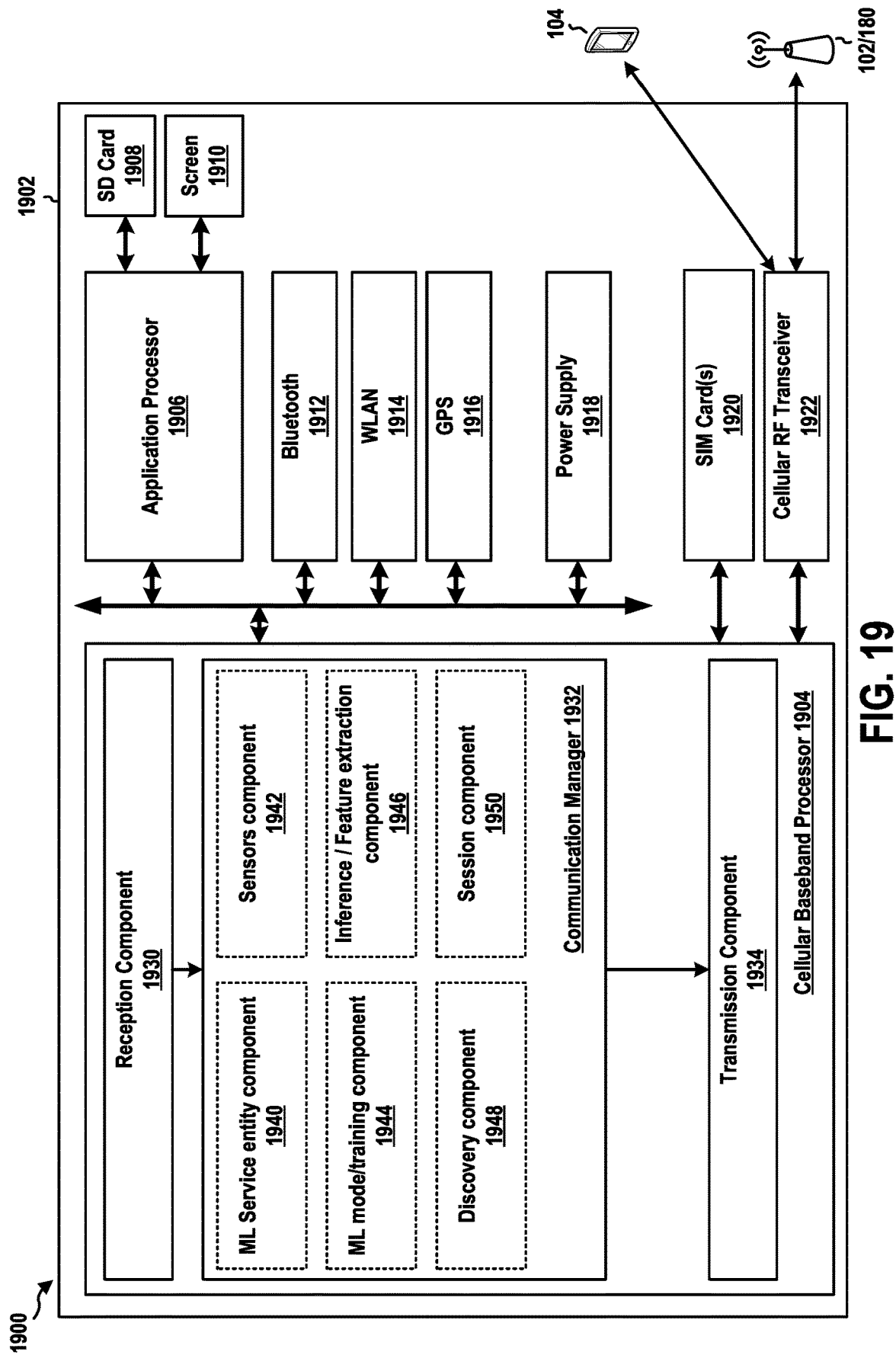
FIG. 19 is a diagram illustrating an example of a hardware implementation for an example apparatus.

FIG. 19 is a diagram 1900 illustrating an example of a hardware implementation for an apparatus 1902. The apparatus 1902 is a UE and includes a cellular baseband processor 1904 (also referred to as a modem) coupled to a cellular RF transceiver 1922 and one or more subscriber identity modules (SIM) cards 1920, an application processor 1906 coupled to a secure digital (SD) card 1908 and a screen 1910, a Bluetooth module 1912, a wireless local area network (WLAN) module 1914, a Global Positioning System (GPS) module 1916, and a power supply 1918. The cellular baseband processor 1904 communicates through the cellular RF transceiver 1922 with the UE 104 and/or base station 102/180. The cellular baseband processor 1904 may include a computer-readable medium/memory. The computer-readable medium/memory may be non-transitory. The cellular baseband processor 1904 is responsible for general processing, including the execution of software stored on the computer-readable medium/memory. The software, when executed by the cellular baseband processor 1904, causes the cellular baseband processor 1904 to perform the various functions described supra. The computer-readable medium/memory may also be used for storing data that is manipulated by the cellular baseband processor 1904 when executing software. The cellular baseband processor 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the cellular baseband processor 1904.

In the context of FIG. 3, the cellular baseband processor 1904 may be a component of the UE 350 and may include the memory 360 and/or at least one of the TX processor 368, the RX processor 356, and the controller/processor 359. In one configuration, the apparatus 1902 may be a modem chip and include just the baseband processor 1904, and in another configuration, the apparatus 1902 may be the entire UE (e.g., the UE 350 of FIG. 3) and include the aforediscussed additional modules of the apparatus 1902. In one configuration, the cellular RF transceiver 1922 may be implemented as at least one of the transmitter 354TX and/or the receiver 354RX.

The communication manager 1932 includes a component 1940 that is configured to control the vehicle-based sensors and the ML machine learning models, manage sensor data, and transmit requests to a network node in or near a base station, e.g., as described in connection with 1702, 1704, and 1706. The communication manager 1932 further includes a component 1942 that receives input in the form of sensors from the component 1940, 1948 and 1950 and is configured to control the sensors in the vehicle, their orientation, and their data output as instructed by the onboard ML service entity or the RAN service entity, e.g., as described in connection with 1712, 1714, and 1716. The communication manager 1932 further includes a component 1944 that receives input in the form of raw data, extracted features, and ML data from the components 1940 and 1942 and is configured to extract ML models and training data, e.g., as described in connection with 1708 and 1712.

Referring still to FIG. 19, the communication manager 1932 further includes a component 1946 that receives input in the form of raw data, and inference data, as well as extracted features from the components 1940, 1942 and 1944 and is configured to extract features and inference data, e.g., as described in connection with 1708 and 1712. The communication manager 1932 further includes a component 1948 that is configured to communicate with entity network node in a coverage area and request service discovery, or to perform service discovery in response to a request, e.g., as described in connection with 1702. The communication manager 1932 further includes a component 1950 that is configured to request and/or execute a data service session, e.g., as described in connection with 1704 and 1804. At 1816. the entity may transmit, to the UE, a dedicated SIB including the ML service information.

The apparatus 1902 may include additional components that perform some or all of the blocks, operations, signaling, etc. of the algorithm(s) in the aforementioned flowchart(s) of FIG. 17. As such, some or all of the blocks, operations, signaling, etc. in the aforementioned flowchart of FIG. 17 and the timing diagrams herein may be performed by a component and the apparatus 1902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
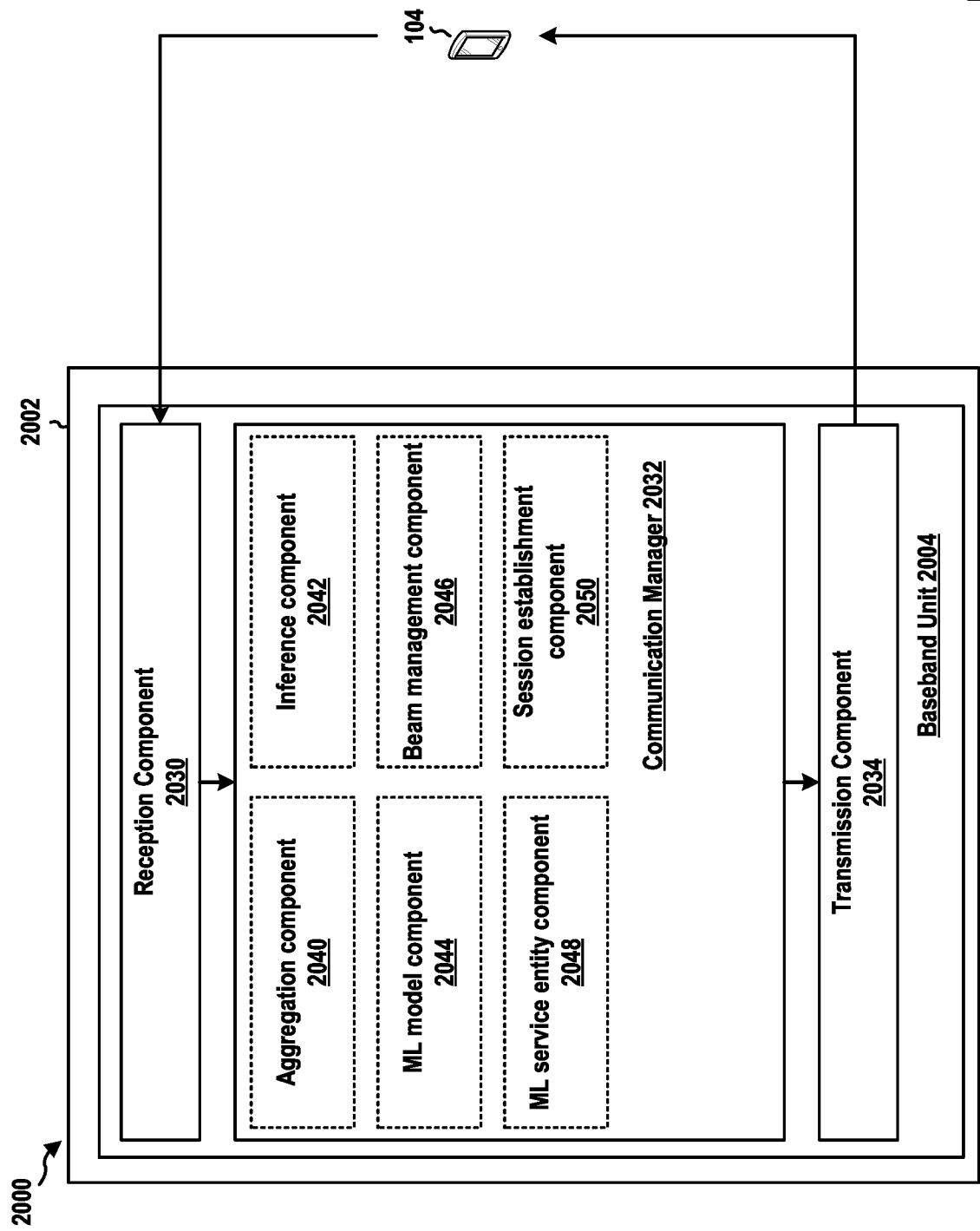
FIG. 20 is a diagram illustrating another example of a hardware implementation for another example apparatus.

FIG. 20 is a diagram 2000 illustrating an example of a hardware implementation for an apparatus 2002. The apparatus 2002 is a base station and includes a baseband unit 2004. The baseband unit 2004 may communicate through a cellular RF transceiver with the UE 104. The baseband unit 2004 may include a computer-readable medium/memory. The baseband unit 2004 is responsible for general processing, including the execution of software stored on the computer-readable medium/memory. The software, when executed by the baseband unit 2004, causes the baseband unit 2004 to perform the various functions described supra. The computer-readable medium/memory may also be used for storing data that is manipulated by the baseband unit 2004 when executing software. The baseband unit 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the baseband unit 2004. The baseband unit 2004 may be a component of the base station 310 and may include the memory 376 and/or at least one of the TX processor 316, the RX processor 370, and the controller/processor 375.

The communication manager 2032 includes a component 2040 that is configured to aggregate ML features from a plurality of vehicles in a coverage area e.g., as described in connection with the steps taken by the ML Engine 805 in FIG. 8, including aggregating vehicle features, incorporating them into neural networks, etc. The communication manager 2032 further includes a component 2042 that communicates to UEs which inference components of available ones should be used, and that uses a central inference unit to extract features and identify objects, e.g., as described in connection with 1712, 1714, 1804, 1806, 1814, and 1820. The communication manager 2032 further includes a component 2044 that is configured to generate ML models based on data and models from UE vehicles, e.g., as described in connection with 1710, 1716, 1808, 1810, and 1816.

The communication manager 2032 further includes a component 2046 that receives data from components 2040, 2042, 2044, and is configured to use ML and training and inference models to predict beam management and adaptively change beams, e.g., as described in connection with 1706 and 1806. The communication manager 2032 further includes a component 2048 that receives data from 2042 and 2044 and is configured to establish a service discovery session with a vehicle UE, e.g., as described in connection with 1802 and 1804. The communication manager 2032 further includes a session establishment component 2050 that receives data from 2042, 2044, and 2046 and is configured to establish a service discovery or a data service session with a vehicle UE, e.g., as described in connection with 1802 and 1804.

The apparatus 2002 may include additional components that perform some or all of the blocks, operations, signaling, etc. of the algorithm(s) in the aforementioned flowchart of FIG. 18, and the related timing diagrams. As such, some or all of the blocks, operations, signaling, etc. in the aforementioned flowchart(s) of FIG. 17 18, and the timing diagrams throughout, may be performed by a component and the apparatus 2002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following examples are illustrative only and may be combined with aspects of other embodiments or teachings described herein, without limitation.

Example 1 is an apparatus of wireless communication at a user equipment (UE), comprising a memory; and at least one processor coupled to the memory and configured to: transmit a discovery message indicating one or more machine learning (ML) services for an ML service discovery; transmit, after the ML service discovery, a session request to establish an ML inference data service session between the UE and a network node based at least in part on the ML service discovery; and transmit ML inference data (e.g., to the network node) for predicting a beam blockage during the ML inference data service session.

Example 2 is the apparatus of example 1, wherein the discovery message comprises an ML service registration request to the network node for predicting the beam blockage using the ML inference data.

Example 3 is the apparatus of any of Examples 1 and 2, wherein the at least one processor is further configured to: receive a message acknowledging the discovery message from the network node wherein the message inquires ML service information from the UE.

Example 4 is the apparatus of any of Examples 1 to 3, wherein the at least one processor is further configured to transmit the ML service information to the network node in response to the message, wherein the ML service information comprises ML inference data parameters including at least sensor parameters, extracted features, ML model parameters, or object tracker parameters.

Example 5 is the apparatus of any of Examples 1 to 4, wherein the at least one processor is further configured to: receive, from the network node, an ML service announcement message indicating an available ML service for beam management.

Example 6 is the apparatus of any of Examples 1 to 5, wherein the at least one processor is further configured to: determine to provide an ML inference data service to an ML inference host in response to the ML service announcement message, wherein the discovery message is transmitted in response to the determination.

Example 7 is the apparatus of any of Examples 1 to 6, wherein the at least one processor is further configured to receive, from a network node, a master information block (MIB) or a system information block (SIB) indicating an ML capability of an ML service entity for predicting the beam blockage using ML inference data; wherein the discovery message is transmitted in response to the MIB or the SIB, and wherein the discovery message requests ML service information from the network node.

Example 8 is the apparatus of any of Examples 1 to 7, wherein the at least one processor is further configured to: receive, from a network node associated with an ML service entity, a radio resource control (RRC) message or a paging message in response to the discovery message, wherein the RRC message or the paging message includes an ML service information request; and transmit, from the UE, a message including ML service information in response to the RRC message or the paging message.

Example 9 is the apparatus of any of Examples 1 to 8, wherein the at least one processor is further configured to: receive, from the network node, an ML service request including at least one of: parameters associated with the ML inference data to be transmitted, and reconfiguration instructions for one or more sensors to collect the sensor data; wherein the session request is transmitted in response to the ML service request, wherein the ML service entity comprises one or more ML inference hosts including one or more ML models for predicting the beam blockage using the inference data.

Example 10 is the apparatus of any of Examples 1 to 9, wherein the session request comprises a radio resource control (RRC) setup request message, the RRC setup request message transmitted to a network node for predicting the beam blockage using the ML inference data.

Example 11 is the apparatus of any of Examples 1 to 10, wherein the at least one processor is further configured to: receive, from a network node, an RRC message including ML inference data service information and a UE ML capability following the session request.

Example 12 is the apparatus of any of Examples 1 to 11, wherein the at least one processor is further configured to: receive, from a network node coupled to an ML service entity, an RRC reconfiguration message including transmission information for the ML inference data service session.

Example 13 is an apparatus for wireless communications at a network node, comprising: a memory; at least one processor coupled to the memory and configured to: receive, from a user equipment (UE), a discovery message indicating an ML service for a ML service discovery; receive, after the ML service discovery, a session request to establish an ML inference data service session between the UE and a network node, the network node interfacing with one or more ML inference hosts; and receive, from the one or more ML inference hosts, a beam blockage prediction using the extraction data from the UE during the ML inference data service session.

Example 14 is the apparatus of Example 13, wherein the network node comprises a base station or a unit of a disaggregated base station, the unit of the disaggregated base station further comprising a central unit, a distributed unit, a virtual central unit, or a virtual distributed unit.

Example 15 is the apparatus of any of Examples 13 and 14, wherein the at least one processor is further configured to: transmit, to the UE, a master information block (MIB) or a system information block (SIB) indicating an ML capability of the network node, wherein the discovery message is received in response to the MIB or the SIB, and wherein the discovery message requests ML service information from the network node.

Example 16 is the apparatus of any of Examples 13 to 15, wherein the at least one processor is further configured to: store a UE ML capability included in the discovery message in a context of the UE in response to the discovery message; and transmit, to the UE, an RRC (radio resource control) message or a paging message including an ML service information request from the network node.

Example 17 is the apparatus of any of Examples 13 to 16, wherein the session request is a radio resource control (RRC) setup request message.

Example 18 is the apparatus of any of Examples 13 to 17, wherein the at least one processor is further configured to: receive, from the UE, a radio resource control (RRC) message including ML inference data service information and a UE ML capability following the session request.

Example 19 is the apparatus of any of Examples 13 to 18, wherein the at least one processor is further configured to: transmit, to the UE, an RRC reconfiguration including transmission information for the ML inference data service session.

Example 20 is a method for wireless communication at a user equipment (UE), comprising: transmitting a discovery message indicating one or more machine learning (ML) services for an ML service discovery; transmitting, after the ML service discovery, a session request to establish an ML inference data service session between the UE and a network node based at least in part on the ML service discovery; and transmitting ML inference data to the network node for predicting a beam blockage during the ML inference data service session.

Example 21 is a method of Example 20, wherein the discovery message comprises an ML service registration request to an ML server including an ML service entity for predicting the beam blockage using the ML inference data.

Example 22 is a method of any of Examples 20 and 21, further comprising: receiving, from a network node associated with the ML service entity, a master information block (MIB) or a system information block (SIB) indicating an ML capability of the ML service entity for predicting the beam blockage using the ML inference data; wherein the discovery message is transmitted in response to the MIB or the SIB, and wherein the discovery message requests ML service information from the ML service entity.

Example 23 is a method of any of Examples 20 to 22, further comprising receiving, from a network node associated with an ML service entity, a radio resource control (RRC) message or a paging message in response to the discovery message, wherein the RRC message or the paging message include an ML service information request; and transmitting, from the UE, a message including ML service information in response to the RRC message or the paging message.

Example 24 is a method of any of Examples 20 to 23, wherein the session request comprises a radio resource control (RRC) setup request message, the RRC setup request message transmitted to a network node for predicting the beam blockage using the ML inference data.

Example 25 is a method of any of Examples 20 to 24, further comprising: transmitting, to a network node, an RRC message including ML inference data service information and a UE ML capability following the session request.

Example 26 is a method of any of Examples 20 to 25, further comprising: receiving, from a network node coupled to an ML service entity, an RRC reconfiguration message including transmission information for the ML inference data service session.

Example 27 is a method for wireless communications at a network node, comprising receiving, from a user equipment (UE), a discovery message indicating an ML service for a ML service discovery; receiving, after the ML service discovery, a session request to establish an ML inference data service session between the UE and an ML service entity, the ML service entity including one or more ML inference hosts including one or more ML models, the ML service entity being associated with the network node; and receiving, from the ML inference host, a beam blockage prediction using the inference data during the ML inference data service session.

Example 28 is a method of Example 27, wherein the network node comprises a base station or a unit of a disaggregated base station, the unit of the disaggregated base station further comprising a central unit, a distributed unit, a virtual central unit, or a virtual distributed unit.

Example 29 is a method of any of Examples 27 and 28, further comprising: storing a UE ML capability included in the discovery message in a context of the UE in response to the discovery message; and transmitting, to the UE, a radio resource control (RRC) message or a paging message including an ML service information request from an ML service entity.

Example 30 is a method of any of Examples 27 to 29, wherein the session request is a radio resource control (RRC) setup request message.

What is claimed is:

1. An apparatus of wireless communication at a user equipment (UE), comprising:
   one or more memories; and
   one or more processors each coupled to at least one of the one or more memories, the one or more processors, individually or in combination, configured to:
   transmit a discovery message indicating one or more machine learning (ML) services of the UE for an ML service discovery;
   transmit, after the ML service discovery, a session request to establish an ML inference data service session between the UE and a network node based at least in part on the ML service discovery;
   transmit ML inference data for predicting a beam blockage during the ML inference data service session; and
   receive an information message indicating an ML capability of an ML service entity for predicting the beam blockage using the ML inference data, wherein the discovery message is transmitted in response to the information message.

2. The apparatus of claim 1, wherein the discovery message comprises an ML service registration request to the network node for predicting the beam blockage using the ML inference data.

3. The apparatus of claim 2, wherein the one or more processors, individually or in combination, are further configured to:
   receive a message acknowledging the discovery message, wherein the acknowledgement message inquires ML service information from the UE.

4. The apparatus of claim 3, wherein the one or more processors, individually or in combination, are further configured to:
   transmit the ML service information in response to the acknowledgment message, wherein the ML service information comprises ML inference data parameters including at least one of sensor parameters, extracted features, ML model parameters, or object tracker parameters.

5. The apparatus of claim 1, wherein the one or more processors, individually or in combination, are further configured to:
   receive an ML service announcement message indicating an available ML service for beam management.

6. The apparatus of claim 5, wherein the one or more processors, individually or in combination, are further configured to:
   determine to provide an ML inference data service to an ML inference host in response to the ML service announcement message, wherein the discovery message is transmitted in response to the determination.

7. The apparatus of claim 1, wherein the
   information message corresponds to a master information block (MIB) or a system information block (SIB) indicating an ML capability of an ML service entity for predicting the beam blockage using the ML inference data;
   wherein the discovery message requests ML service information from the network node.

8. The apparatus of claim 1, wherein the one or more processors, individually or in combination, are further configured to:
receive a radio resource control (RRC) message or a paging message in response to the discovery message, wherein the RRC message or the paging message includes an ML service information request; and
transmit a message including ML service information in response to the RRC message or the paging message.

9. The apparatus of claim 1, wherein the one or more processors, individually or in combination, are further configured to:
receive an ML service request from an ML service entity including at least one of:
parameters associated with the ML inference data to be transmitted, and
reconfiguration instructions for one or more sensors to collect sensor data;
wherein the session request is transmitted in response to the ML service request, wherein the ML service entity comprises one or more ML inference hosts including one or more ML models for predicting the beam blockage using the inference data.

10. The apparatus of claim 1, wherein the session request comprises a radio resource control (RRC) setup request message for predicting the beam blockage using the ML inference data.

11. The apparatus of claim 1, wherein the one or more processors, individually or in combination, are further configured to:
transmit an RRC message including ML inference data service information and a UE ML capability following the session request.

12. The apparatus of claim 1, wherein the one or more processors, individually or in combination, are further configured to:
receive an RRC reconfiguration message including transmission information for the ML inference data service session.

13. An apparatus of wireless communications at a network node, comprising:
one or more memories; and
one or more processors each coupled to at least one of the one or more memories, the one or more processors, individually or in combination, being configured to:
receive, from a user equipment (UE), a discovery message indicating an ML service of the UE for an ML service discovery;
receive, after the ML service discovery, a session request to establish an ML inference data service session between the UE and the network node, the network node interfacing with one or more ML inference hosts;
receive, from the one or more ML inference hosts, a network beam blockage prediction using ML inference data from the UE during the ML inference data service session; and
transmit, to the UE, an information message indicating an ML capability of the network node, wherein the discovery message is received in response to the information message.

14. The apparatus of claim 13, wherein the network node comprises a base station or a unit of a disaggregated base station, the unit of the disaggregated base station comprising a central unit, a distributed unit, a virtual central unit, or a virtual distributed unit.

15. The apparatus of claim 13, wherein the information message corresponds to a master information block (MIB) or a system information block (SIB) indicating an ML capability of the network node,
wherein the discovery message requests ML service information from the network node.

16. The apparatus of claim 13, wherein the one or more processors, individually or in combination, are further configured to:
store a UE ML capability included in the discovery message in a context of the UE in response to the discovery message; and
transmit, to the UE, an RRC (radio resource control) message or a paging message including an ML service information request from the network node.

17. The apparatus of claim 13, wherein the session request is a radio resource control (RRC) setup request message.

18. The apparatus of claim 13, wherein the one or more processors, individually or in combination, are further configured to:
receive, from the UE, a radio resource control (RRC) message including ML inference data service information and a UE ML capability following the session request.

19. The apparatus of claim 13, wherein the one or more processors, individually or in combination, are further configured to:
transmit, to the UE, an RRC reconfiguration including transmission information for the ML inference data service session.

20. A method for wireless communication at a user equipment (UE), comprising:
transmitting a discovery message indicating one or more machine learning (ML) services of the UE for an ML service discovery;
transmitting, after the ML service discovery, a session request to establish an ML inference data service session between the UE and a network node based at least in part on the ML service discovery;
transmitting ML inference data for network prediction of a beam blockage during the ML inference data service session; and
receiving an information message indicating an ML capability of a ML service entity for predicting the beam blockage using the ML inference data, wherein the discovery message is transmitted in response to the information message.

21. The method of claim 20, wherein the discovery message comprises an ML service registration request to an ML server including an ML service entity for predicting the beam blockage using the ML inference data.

22. The method of claim 20,
wherein the information message corresponds to a master information block (MIB) or a system information block (SIB) indicating an ML capability of the ML service entity for predicting the beam blockage using the ML inference data;
wherein the discovery message requests ML service information from the ML service entity.

23. The method of claim 20, further comprising:
receiving a radio resource control (RRC) message or a paging message in response to the discovery message, wherein the RRC message or the paging message includes an ML service information request; and
transmitting a message including ML service information in response to the RRC message or the paging message.

24. The method of claim 20, wherein the session request comprises a radio resource control (RRC) setup request message for predicting the beam blockage using the ML inference data.

25. The method of claim 20, further comprising:
transmitting an RRC message including ML inference data service information and a UE ML capability following the session request.

26. The method of claim 20, further comprising:
receiving an RRC reconfiguration message including transmission information for the ML inference data service session.

27. A method for wireless communication at a network node, comprising:
receiving, from a user equipment (UE), a discovery message indicating an ML service of the UE for an ML service discovery;
receiving, after the ML service discovery, a session request to establish an ML inference data service session between the UE and the network node, the network node interfacing with an ML inference host;
receiving, from the ML inference host, a network beam blockage prediction using the inference data during the ML inference data service session; and
transmitting, to the UE, an information message indicating an ML capability of the network node, wherein the discovery message is received in response to the information message.

28. The method of claim 27, wherein the network node comprises a base station or a unit of a disaggregated base station, the unit of the disaggregated base station comprising a central unit, a distributed unit, a virtual central unit, or a virtual distributed unit.

29. The method of claim 27, further comprising:
storing a UE ML capability included in the discovery message in a context of the UE in response to the discovery message; and
transmitting, to the UE, a radio resource control (RRC) message or a paging message including an ML service information request from an ML service entity.

30. The method of claim 27, wherein the session request is a radio resource control (RRC) setup request message.

* * * * *